(12) United States Patent
Miyatake

(10) Patent No.: US 12,461,305 B2
(45) Date of Patent: Nov. 4, 2025

(54) QUANTUM CIRCUIT, QUANTUM COMPUTER, AND METHOD OF MANUFACTURING QUANTUM CIRCUIT

(71) Applicant: Fujitsu Limited, Kawasaki (JP)

(72) Inventor: Tetsuya Miyatake, Isehara (JP)

(73) Assignee: Fujitsu Limited, Kawasaki (JP)

( * ) Notice: Subject to any disclaimer, the term of this patent is extended or adjusted under 35 U.S.C. 154(b) by 285 days.

(21) Appl. No.: 18/189,729

(22) Filed: Mar. 24, 2023

(65) Prior Publication Data

US 2023/0280528 A1    Sep. 7, 2023

Related U.S. Application Data

(63) Continuation of application No. PCT/JP2020/044622, filed on Dec. 1, 2020.

(51) Int. Cl.
*G02B 6/122* (2006.01)
*G02B 6/13* (2006.01)

(52) U.S. Cl.
CPC ............. *G02B 6/122* (2013.01); *G02B 6/13* (2013.01)

(58) Field of Classification Search
CPC ...... G02B 6/122; G02B 6/13; G02B 6/12004; G02F 1/395; G02F 3/00; G06E 3/005
See application file for complete search history.

(56) References Cited

U.S. PATENT DOCUMENTS

| 8,837,534 B2 | 9/2014 | Lancaster et al. |
| 9,157,859 B2 | 10/2015 | Walsworth et al. |
| 2004/0071420 A1* | 4/2004 | Sezerman ............ G02B 6/2821 385/123 |
| 2023/0062860 A1* | 3/2023 | Dantus .................... C30B 33/02 |

FOREIGN PATENT DOCUMENTS

| JP | 2003-506731 A | 2/2003 |
| JP | 2005-538392 A | 12/2005 |
| JP | 2013-544441 A | 12/2013 |
| WO | WO-2001/009899 A1 | 2/2001 |
| WO | WO-2004/013668 A2 | 2/2004 |
| WO | WO-2012/071622 A1 | 6/2012 |

OTHER PUBLICATIONS

Sipahigil, A. et al., "An integrated diamond nanophotonics platform for quantum-optical networks", Science (American Association for the Advancement of Science), pp. 847-850, XP093101770, (2016).

(Continued)

*Primary Examiner* — Michael P Mooney
(74) *Attorney, Agent, or Firm* — ArentFox Schiff LLP

(57) ABSTRACT

A method of manufacturing a quantum circuit, the method includes forming, in a diamond layer that includes a color center, an optical waveguide optically coupled the color center, the diamond layer having a first principal surface and a second principal surface, wherein the optical waveguide includes: a core region that includes the color center; and an optical confinement region provided around the core region, a refractive index of the optical confinement region is lower than the refractive index of the core region.

11 Claims, 41 Drawing Sheets

(56) References Cited

OTHER PUBLICATIONS

Extended European Search Report dated Dec. 20, 2023 for corresponding European Patent Application No. 20964220.6.
Japanese Office Action mailed Apr. 23, 2024, for corresponding Japanese Patent Application No. 2022-566521.
Hadden, J.P., et al., "Integrated waveguides and deterministically positioned nitrogen vacancy centers in diamond created by femtosecond laser writing", Optics Letters, Optical Society of America, vol. 43, No. 15, pp. 3586-3589, (Aug. 1, 2018).
Sotillo, B., et al., "Diamond photonics platform enabled by femtosecond laser writing", Scientific Reports, vol. 6, article No. 35566, pp. 1-9, (Oct. 17, 2016).
Hanafi, H., et al., "Polycrystalline diamond photonic waveguides realized by femtosecond laser lithography", Optica: Materials Express, vol. 9, No. 7, pp. 3109-3114, (Jun. 24, 2019).
Booth, M., et al., "Dynamic optical laser fabrication for engineering of quantum photonic devices", Proc. SPIE 10926, Quantum Sensing and Nano Electronics and Photonics XVI, vol. 10926, pp. 10926Y-1-10926Y-6, doi: 10.1117/12.2509144, (Feb. 1, 2019).
International Search Report and Written Opinion, issued by International Searching Authority in International Application No. PCT/JP2020/044622, mailed on Feb. 9, 2021.
Chinese Office Action issued Jun. 30, 2025, for corresponding Chinese Patent Application No. 202080105873.2, with Machine Translation.

\* cited by examiner

FIG. 7
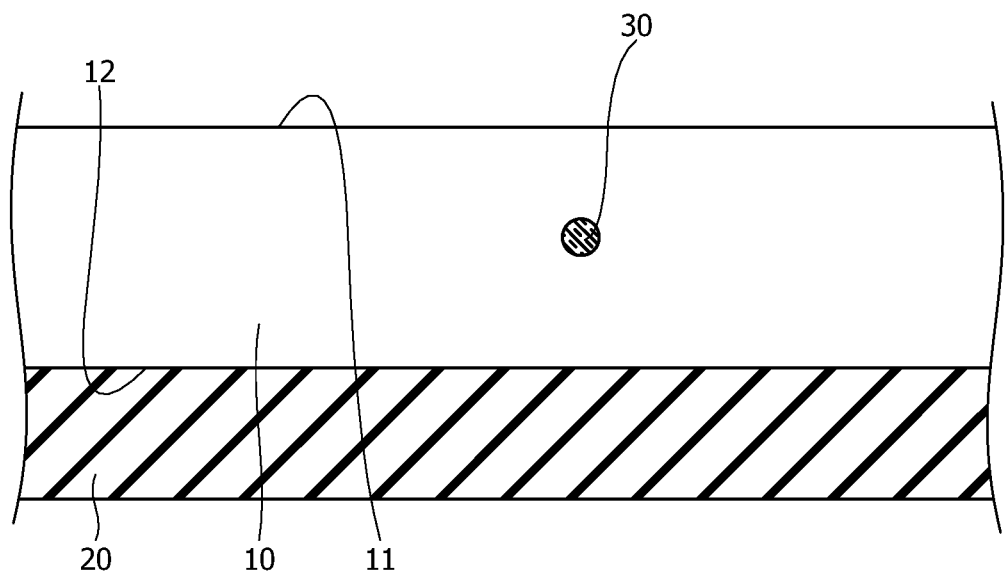
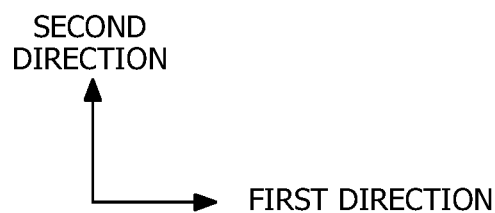

FIG. 9
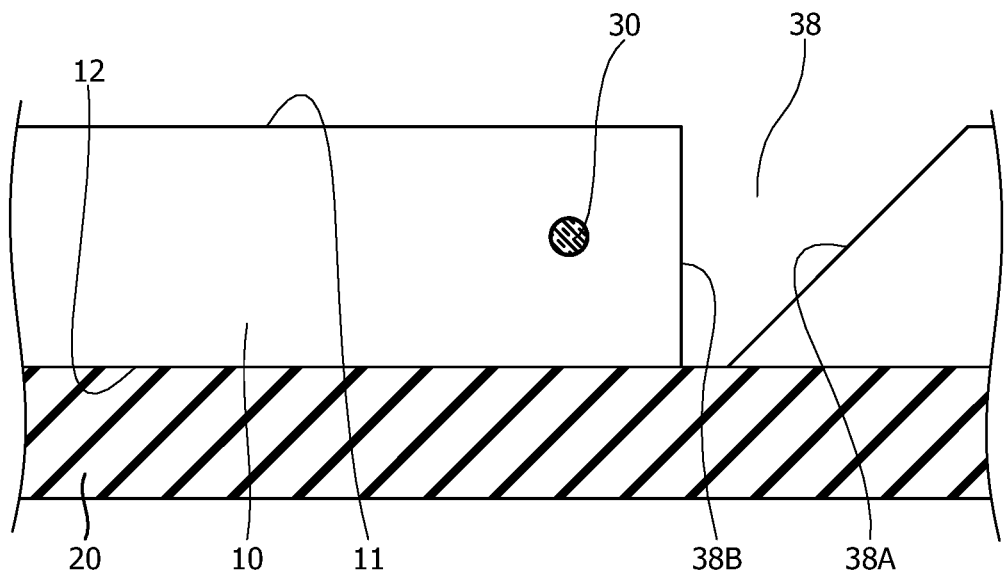
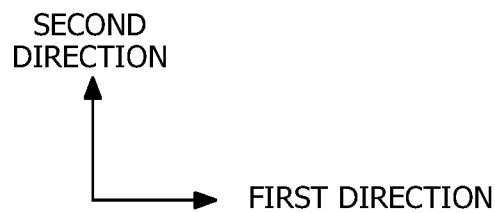

FIG. 11
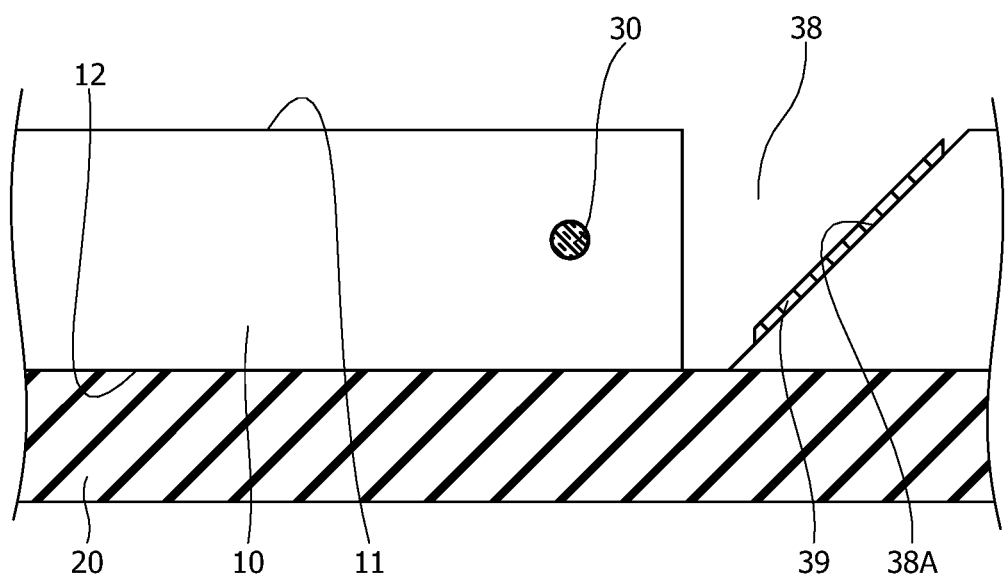
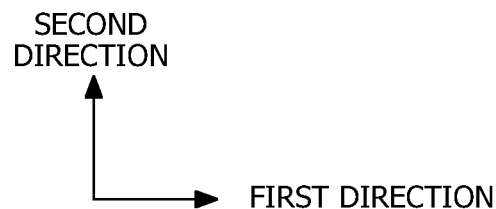

QUANTUM CIRCUIT, QUANTUM COMPUTER, AND METHOD OF MANUFACTURING QUANTUM CIRCUIT

CROSS-REFERENCE TO RELATED APPLICATION

This application is a continuation application of International Application PCT/JP2020/044622 filed on Dec. 1, 2020 and designated the U.S., the entire contents of which are incorporated herein by reference.

FIELD

The present disclosure relates to a quantum circuit, a quantum computer, and a method of manufacturing a quantum circuit.

BACKGROUND

A quantum circuit using a color center in a diamond layer has been under study. Furthermore, a technique of forming an optical waveguide in the diamond layer for propagating emitted light in the color center has also been under study.
Patent Document 1: U.S. Pat. No. 9,157,859, Patent Document 2: U.S. Pat. No. 8,837,534, Patent Document 3: Japanese National Publication of International Patent Application No. 2013-544441, Non-Patent Document 1: Integrated waveguides and deterministically positioned nitrogen vacancy centers in diamond created by femtosecond laser writing, Optics Letters, 43 (15), 3586-3589 (2018), Non-Patent Document 2: Diamond photonics platform enabled by femtosecond laser writing, Scientific Reports 6, 35566 (2016).

SUMMARY

According to an aspect of the embodiments, a method of manufacturing a quantum circuit, the method includes forming, in a diamond layer that includes a color center, an optical waveguide optically coupled the color center, the diamond layer having a first principal surface and a second principal surface, wherein the optical waveguide includes: a core region that includes the color center; and an optical confinement region provided around the core region, a refractive index of the optical confinement region is lower than the refractive index of the core region, and the forming the optical waveguide includes: forming, in the diamond layer, a groove that is away from the color center and has an inclined surface; forming a reflective film over the inclined surface; forming a first region on a side of the first principal surface of the color center by emitting femtosecond laser light to a first part of the reflective film and concentrating the femtosecond laser light reflected by the reflective film onto the side of the first principal surface of the color center to lower the refractive index of the first part of the diamond layer; forming a second region on a side of the second principal surface of the color center by emitting the femtosecond laser light to a second part of the reflective film and concentrating the femtosecond laser light reflected by the reflective film onto the side of the second principal surface of the color center to lower the refractive index of the second part of the diamond layer; forming a third region on a first side of the core region by emitting the femtosecond laser light to the first part of the first principal surface and concentrating the femtosecond laser light onto the first side of the core region in a first direction parallel to the first principal surface to lower the refractive index of the second part of the diamond layer; and forming a fourth region on a second side of the core region by emitting the femtosecond laser light to the second part of the first principal surface and concentrating the femtosecond laser light onto the second side of the core region in the first direction to lower the refractive index of the second part of the diamond layer.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 7 is a diagram (part 1) illustrating a method of manufacturing a quantum circuit according to a first embodiment;

FIG. 9 is a diagram (part 3) illustrating the method of manufacturing a quantum circuit according to the first embodiment;

FIG. 11 is a diagram (part 5) illustrating the method of manufacturing a quantum circuit according to the first embodiment;

DESCRIPTION OF EMBODIMENTS

An optical waveguide formed by an existing method causes a large optical signal loss.

An object of the present disclosure is to provide a quantum circuit, a quantum computer, and a method of manufacturing a quantum circuit capable of reducing an optical signal loss.

According to the present disclosure, it becomes possible to reduce an optical signal loss.

Hereinafter, embodiments of the present disclosure will be specifically described with reference to the accompanying drawings. Note that, in the present specification and drawings, components having substantially the same functional configuration are denoted by the same reference signs, and redundant descriptions may be omitted.

(Reference Example)

First, a reference example will be described. FIGS. 1 to 6 are diagrams illustrating a method of manufacturing a quantum circuit according to the reference example.

Figure 1:
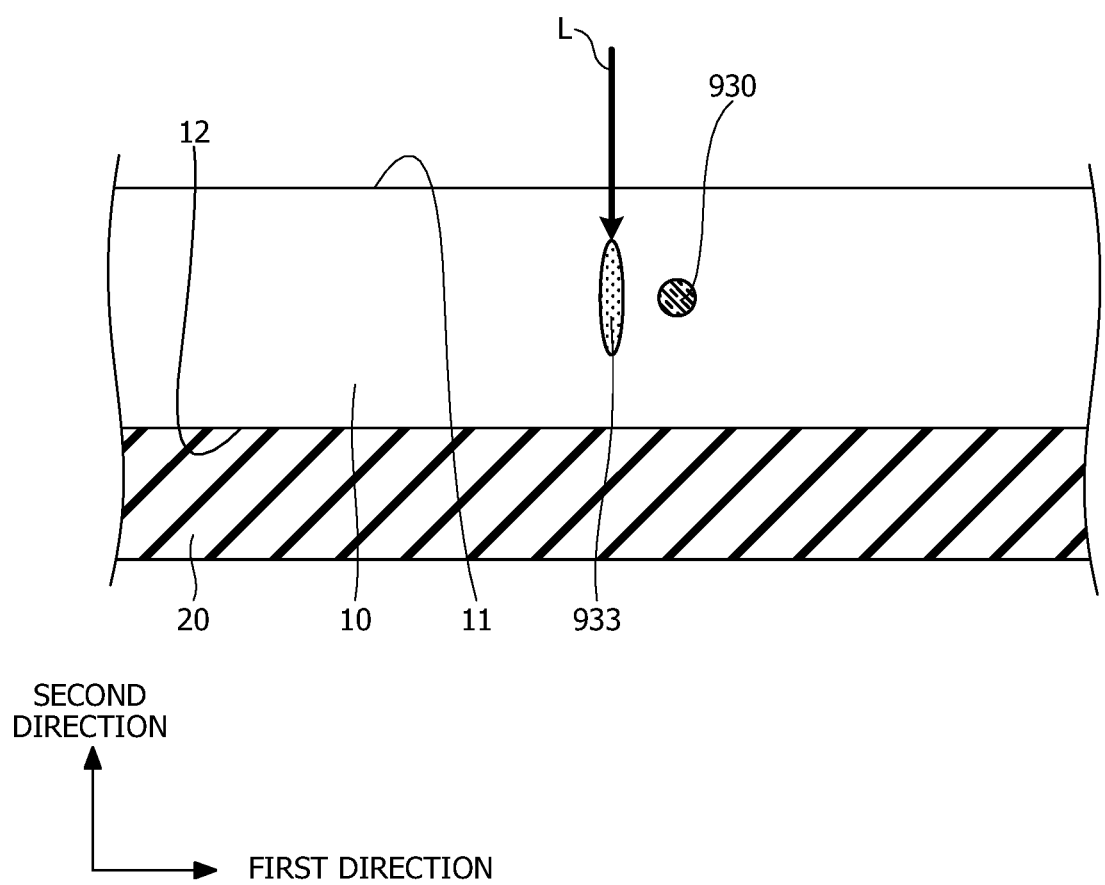
FIG. 1 is a diagram (part 1) illustrating a method of manufacturing a quantum circuit according to a reference example.

In the method of manufacturing a quantum circuit according to the reference example, first, a diamond layer 10 formed over a base material 20 is prepared as illustrated in FIG. 1. The diamond layer 10 has a second principal surface 12 on the side of the base material 20 and a first principal surface 11 on the side opposite to the second principal surface 12, and includes a color center 930. Next, femtosecond laser light L is emitted to a part of the first principal surface 11, and the femtosecond laser light L is concentrated onto one side of the color center 930 in a first direction parallel to the first principal surface 11. As a result, the portion of the diamond layer 10 at which the femtosecond laser light L is concentrated is altered, thereby forming an altered region 933. Along with the alteration, the refractive index of the altered region 933 becomes lower than the surrounding refractive index.

Figure 2:
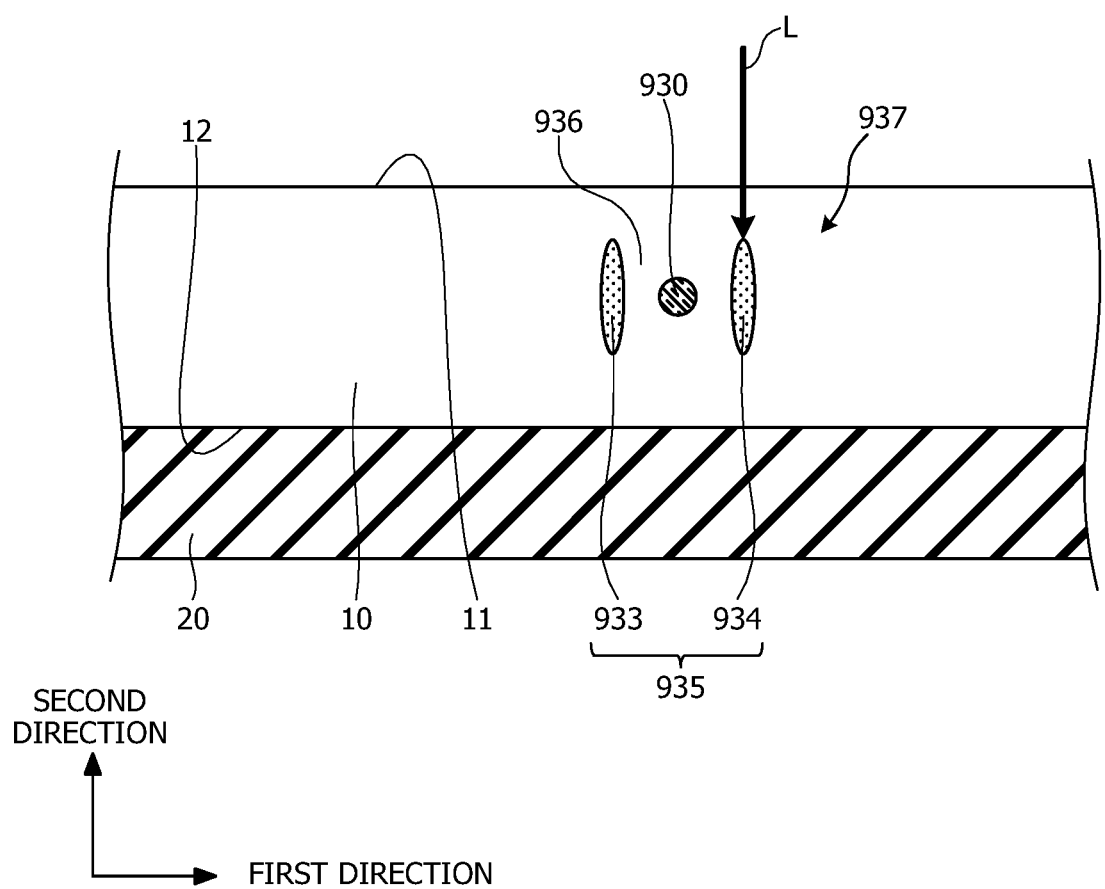
FIG. 2 is a diagram (part 2) illustrating the method of manufacturing a quantum circuit according to the reference example.

Thereafter, as illustrated in FIG. 2, the femtosecond laser light L is emitted to another part of the first principal surface 11, and the femtosecond laser light L is concentrated onto the other side of the color center 930 in the first direction. As a result, the portion of the diamond layer 10 at which the femtosecond laser light L is concentrated is altered, thereby forming an altered region 934. Along with the alteration, the refractive index of the altered region 934 becomes lower than the surrounding refractive index.

Figure 3:
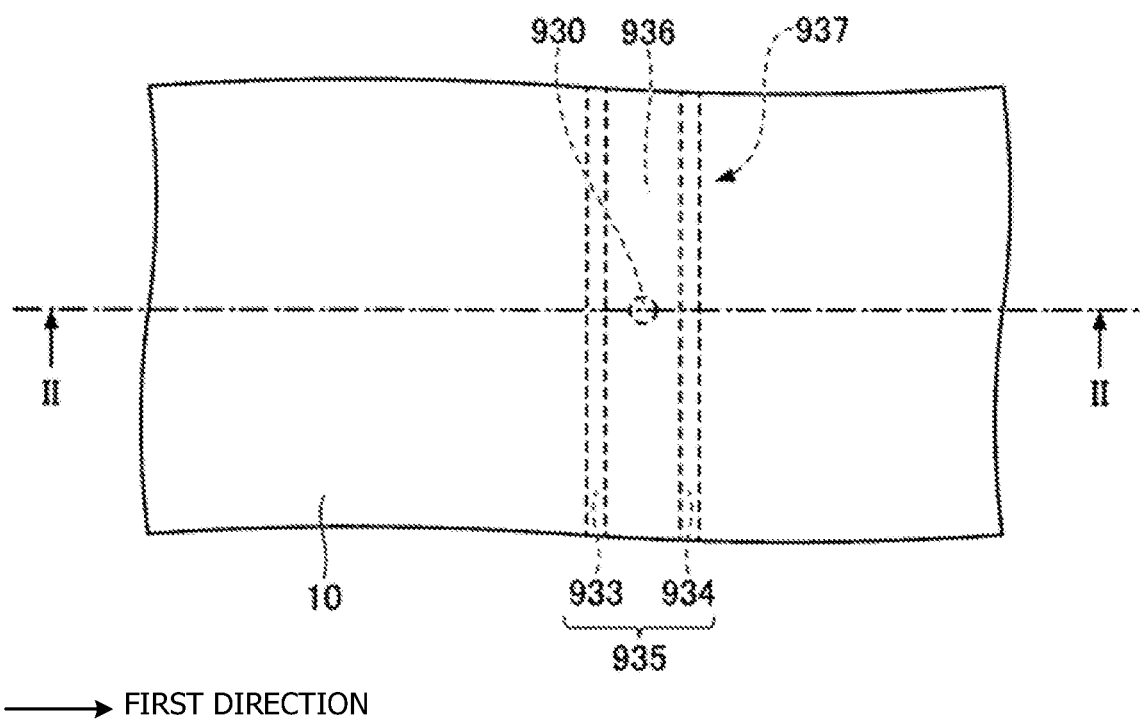
FIG. 3 is a diagram (part 3) illustrating the method of manufacturing a quantum circuit according to the reference example.

Note that the emission of the femtosecond laser light L is carried out while scanning linearly, for example. Thus, as illustrated in FIG. 3, the altered regions 933 and 934 are formed in a linear shape with the color center 930 interposed therebetween, for example. The refractive index of the region between the altered regions 933 and 934 is higher than the refractive index of the altered regions 933 and 934. Therefore, the altered regions 933 and 934 exert an optical confinement effect on the region between the altered regions 933 and 934. That is, an optical waveguide 937 having a core region 936 between the altered regions 933 and 934 and an optical confinement region 935 including the altered regions 933 and 934 is formed. FIG. 2 corresponds to a cross-sectional view taken along line II-II defined in FIG. 3.

In this manner, it becomes possible to produce a quantum circuit including the optical waveguide 937 optically coupled to the color center 930.

However, in the optical waveguide 937 formed according to this reference example, while light may be confined in the first direction, the optical confinement effect may not be exerted in a second direction perpendicular to the first principal surface 11.

Figure 4:
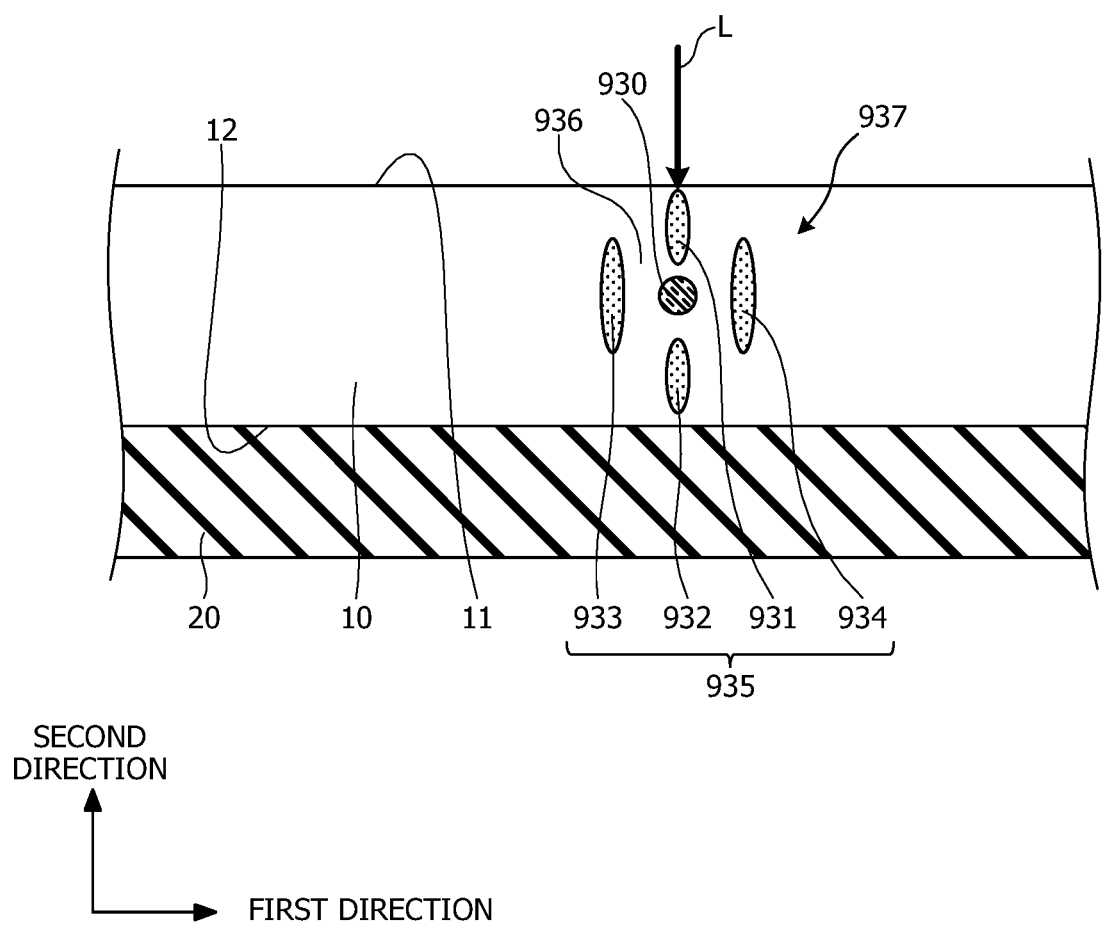
FIG. 4 is a diagram (part 4) illustrating the method of manufacturing a quantum circuit according to the reference example.
Figure 5:
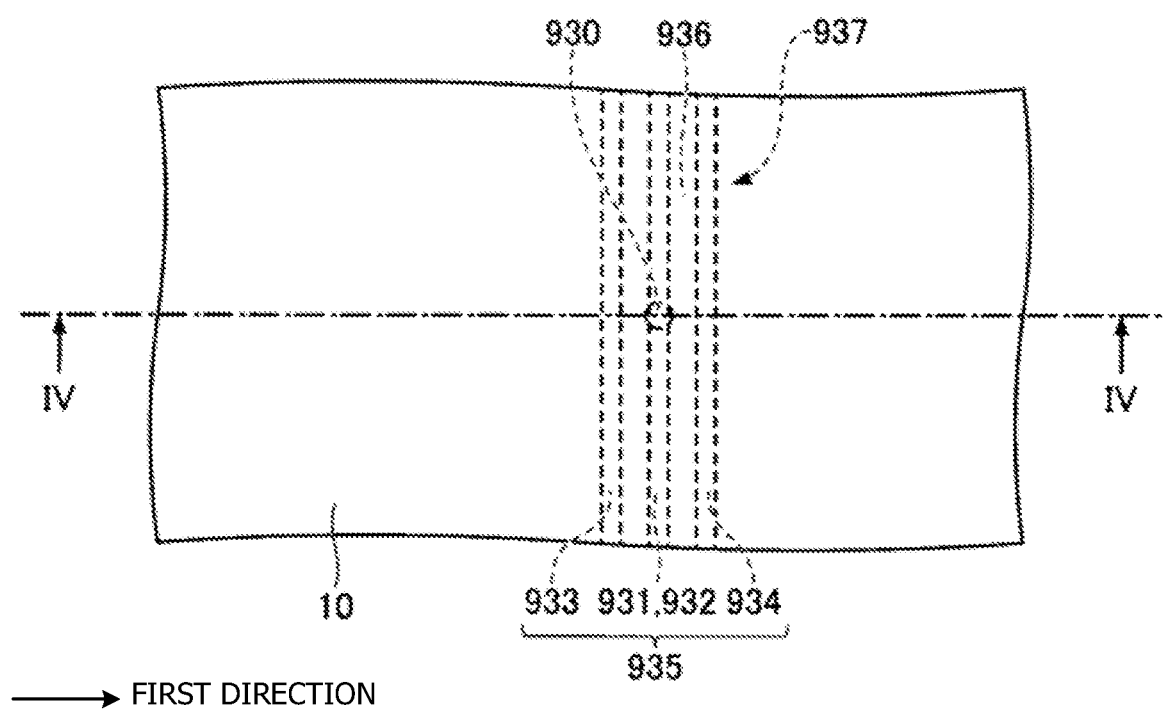
FIG. 5 is a diagram (part 5) illustrating the method of manufacturing a quantum circuit according to the reference example.

In order to confine light in the second direction as well, it is also conceivable to form an altered region 931 on the first principal surface 11 side of the color center 930 and to form an altered region 932 on the second principal surface 12 side of the color center 930 by emitting the femtosecond laser light L in a similar manner, as illustrated in FIGS. 4 and 5. FIG. 4 corresponds to a cross-sectional view taken along line IV-IV defined in FIG. 5.

However, the altered regions 931 and 932 have a shape whose longitudinal direction is the second direction, which is the irradiation direction, when viewed in the cross section from the direction along which the optical waveguide 937 extends, and thus it is difficult to increase dimensions of the altered regions 931 and 932 in the first direction. Thus, a sufficient optical confinement effect may not be exerted in the second direction.

Figure 6:
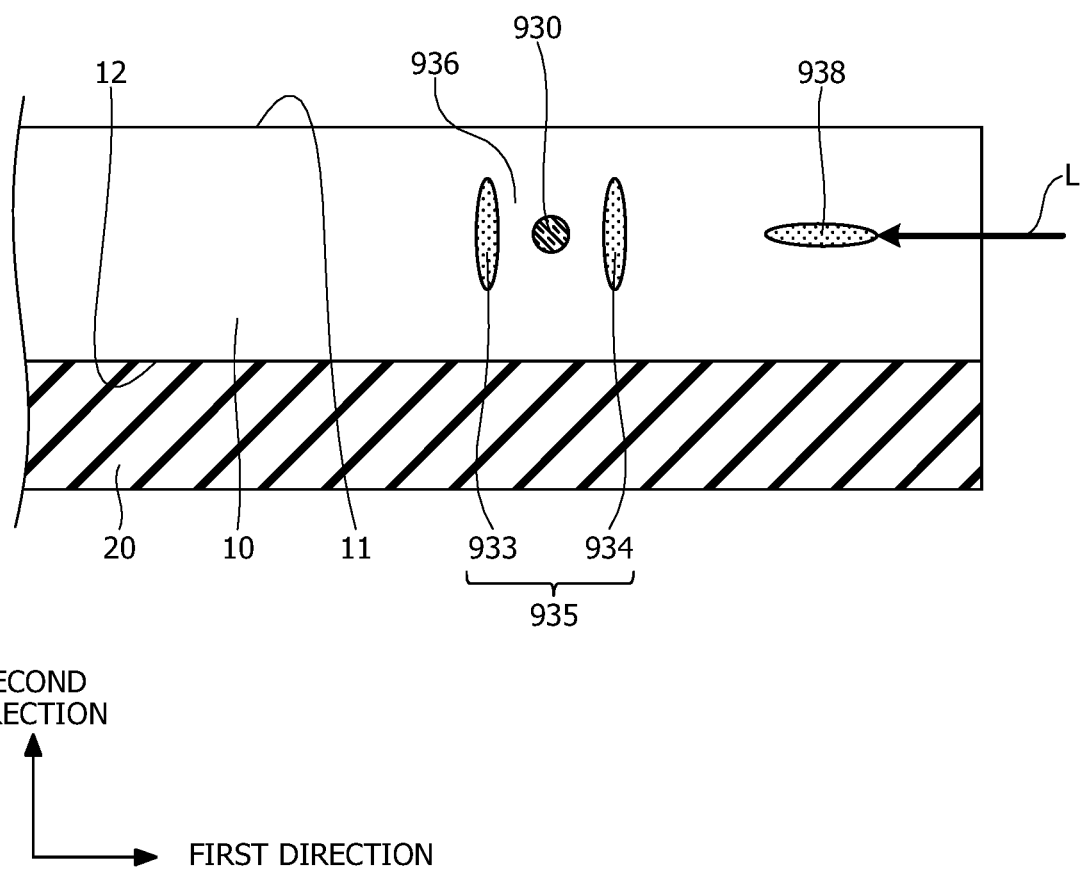
FIG. 6 is a diagram (part 6) illustrating the method of manufacturing a quantum circuit according to the reference example.

Furthermore, as illustrated in FIG. 6, it is also conceivable to emit the femtosecond laser light L to the end face of the diamond layer. However, there is a limit to a position of an altered region 938 that may be formed by the emission to the end face, and the altered region may not be formed at a desired position when the distance between the color center 930 and the end face is long.

The inventor of the present application has conducted an intensive study in consideration of such a reference example, and as a result, conceived the following embodiments.

First Embodiment

Next, a first embodiment will be described. The first embodiment relates to a method of manufacturing a quantum circuit. FIGS. 7 to 19 are diagrams illustrating the method of manufacturing a quantum circuit according to the first embodiment. FIGS. 7, 9, 11, 13, 15, 17, and 19 are cross-sectional views, and FIGS. 8, 10, 12, 14, 16, and 18 are top views. In the first embodiment, an optical waveguide optically coupled to a color center is formed in a diamond layer including the color center.

In the first embodiment, first, as illustrated in FIG. 7, a diamond layer 10 formed over a base material 20 is prepared. The base material 20 includes, for example, Si or $SiO_2$. The diamond layer 10 includes, for example, single-crystal diamond. The diamond layer 10 has a second principal surface 12 on the side of the base material 20 and a first principal surface 11 on the side opposite to the second principal surface 12, and includes a color center 30. The color center 30 is, for example, a nitrogen-vacancy center (NV center) including nitrogen and a vacancy. The color center 30 may be a silicon-vacancy center (SiV center) including silicon and a vacancy, a germanium-vacancy center (GeV center) including germanium and a vacancy, a tin-vacancy center (SnV center) including tin and a vacancy, a lead-vacancy center (PbV center) including lead and a vacancy, or a boron-vacancy center (BV center) including boron and a vacancy.

Figure 8:
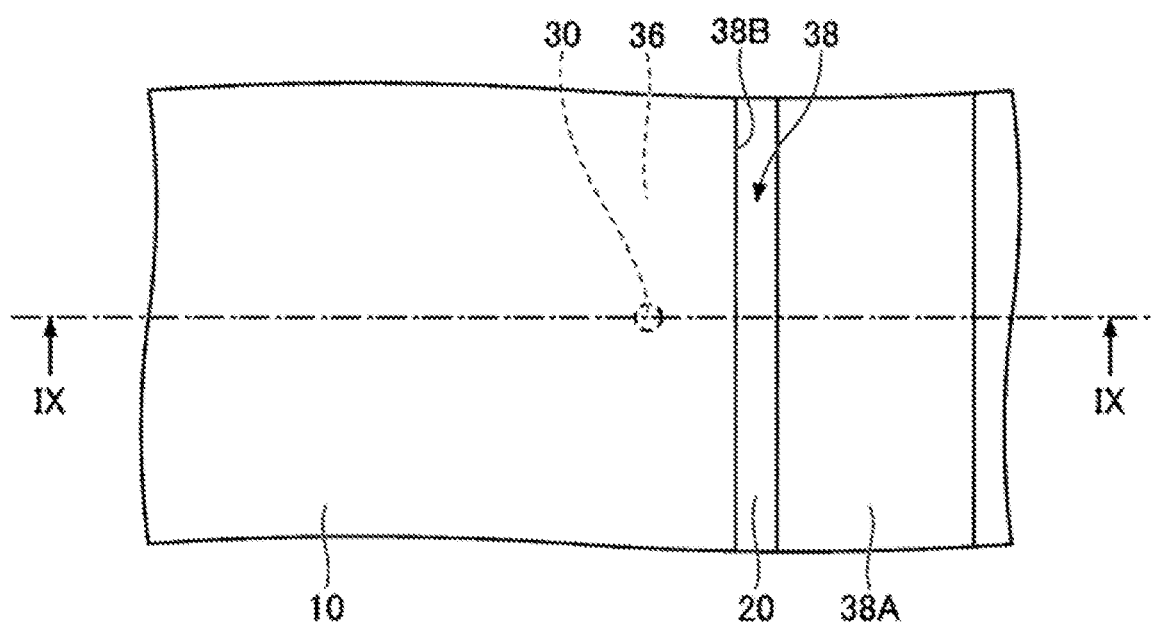
FIG. 8 is a diagram (part 2) illustrating the method of manufacturing a quantum circuit according to the first embodiment.

Next, as illustrated in FIGS. 8 and 9, a groove 38 away from the color center 30 is formed in the diamond layer 10. The groove 38 is formed along the optical waveguide to be formed. The groove 38 has, for example, a side surface 38A inclined with respect to the first principal surface 11, and a side surface 38B perpendicular to the first principal surface 11. The side surface 38B is positioned between the color center 30 and the side surface 38A. The side surface 38A may be visually identified from the first principal surface 11 side, and is formed to be inclined with respect to the first principal surface 11 by, for example, 40 to 50 degrees, preferably 45 degrees. The side surface 38A is an exemplary inclined surface. FIG. 9 corresponds to a cross-sectional view taken along line IX-IX defined in FIG. 8.

Figure 10:
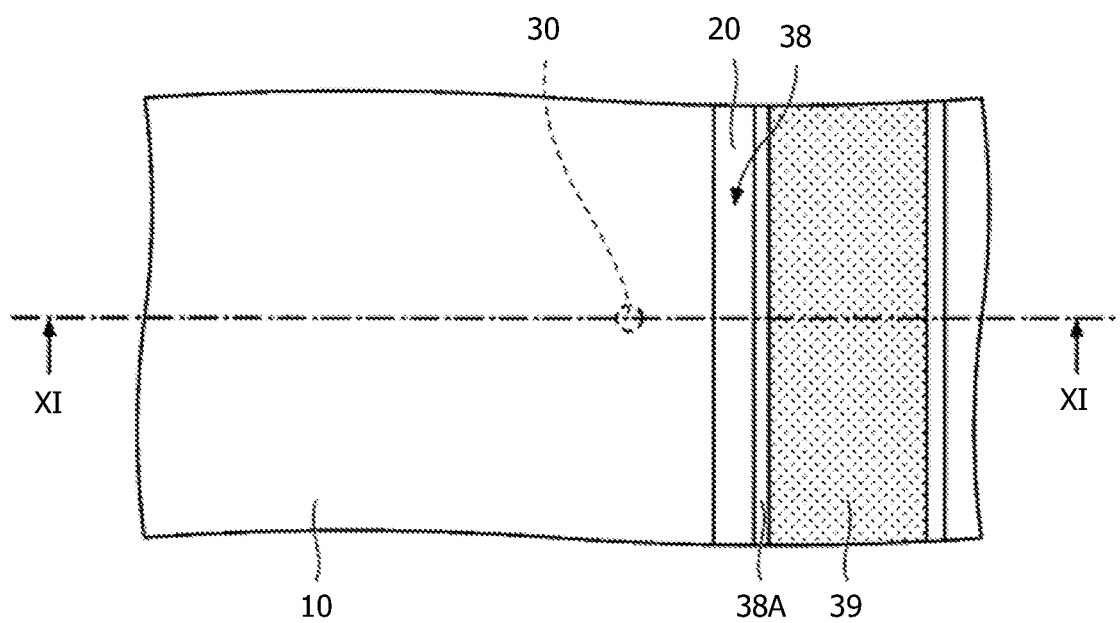
FIG. 10 is a diagram (part 4) illustrating the method of manufacturing a quantum circuit according to the first embodiment.

Thereafter, as illustrated in FIGS. 10 and 11, a reflective film 39 that reflects femtosecond laser light is formed over the side surface 38A. Here, the reflective film 39 is formed over a part of the side surface 38A. The reflective film 39 is formed along the optical waveguide to be formed. The reflective film 39 is, for example, a film made of metal such as Au, Al, or the like. Although the thickness of the reflective film 39 is not particularly limited, it is, for example, approximately 0.1 μm to 1.0 μm. The reflective film 39 may be formed by, for example, a lift-off method. FIG. 11 corresponds to a cross-sectional view taken along line XI-XI defined in FIG. 10.

Figure 12:
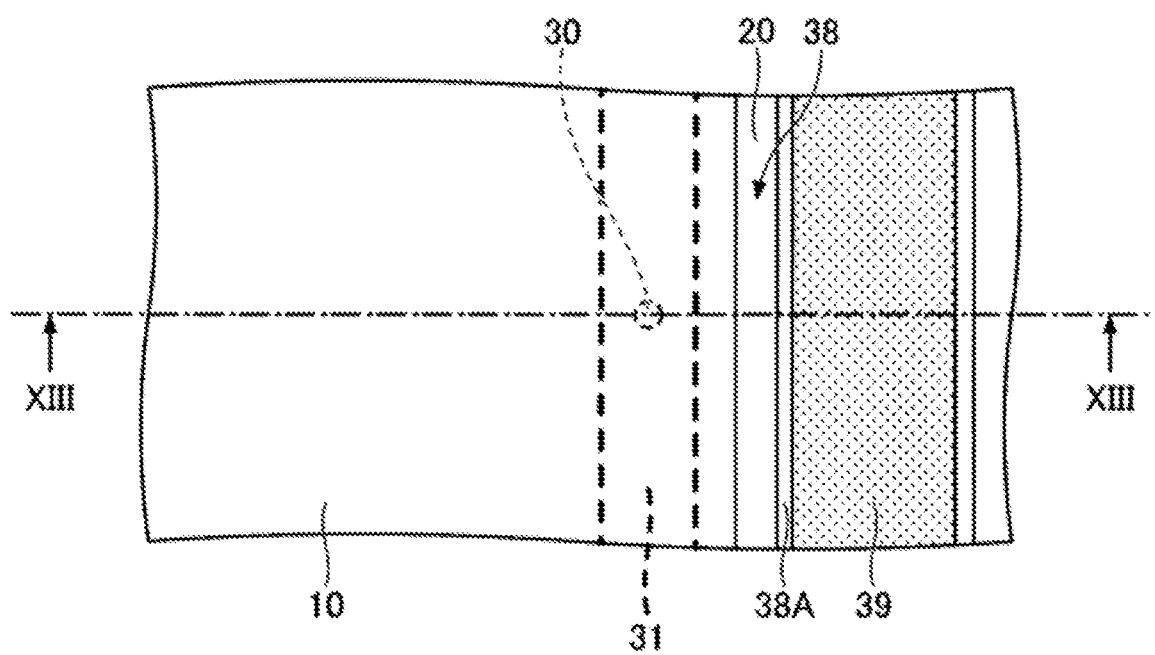
FIG. 12 is a diagram (part 6) illustrating the method of manufacturing a quantum circuit according to the first embodiment.
Figure 13:
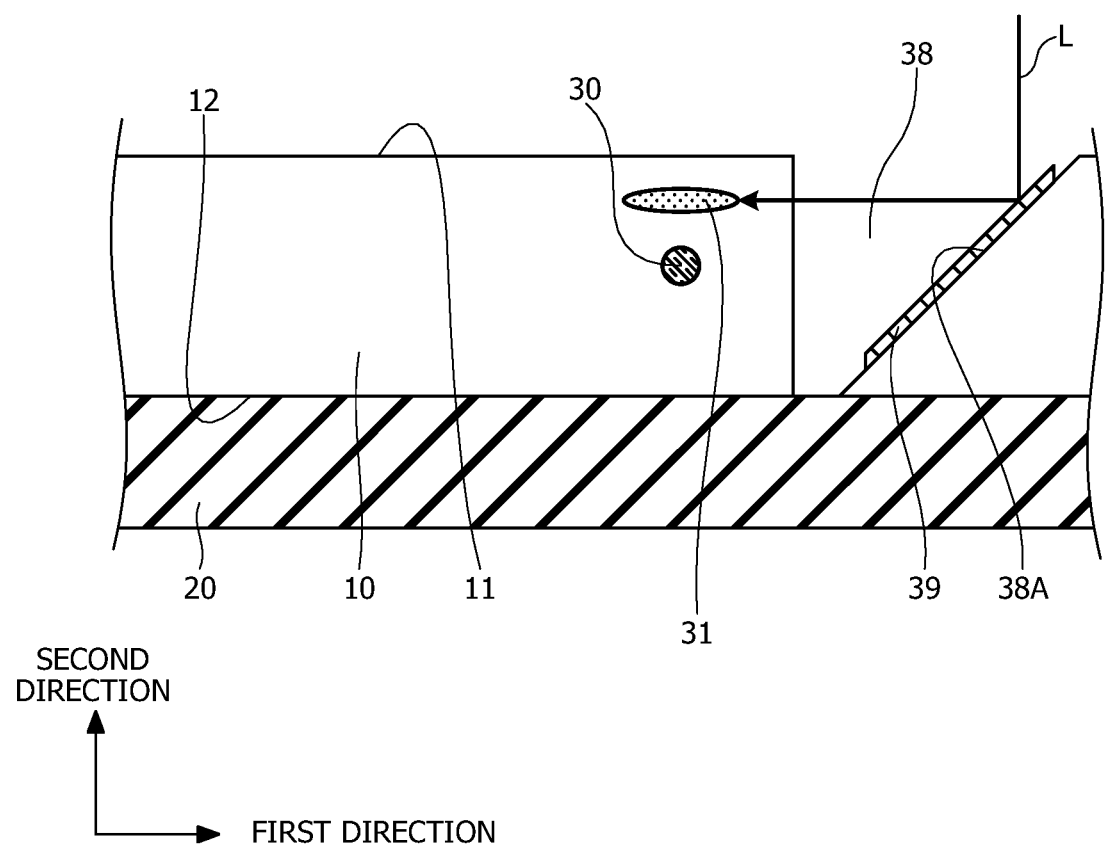
FIG. 13 is a diagram (part 7) illustrating the method of manufacturing a quantum circuit according to the first embodiment.

Subsequently, as illustrated in FIGS. 12 and 13, femtosecond laser light L is emitted to a part of the reflective film 39, and the femtosecond laser light L reflected by the reflective film 39 is concentrated onto the first principal surface 11 side of the color center 30. As a result, the portion of the diamond layer 10 at which the femtosecond laser light L is concentrated is altered, thereby forming an altered region 31. Examples of the alteration of the diamond layer 10 include amorphization, carbonization, and ablation. Along with the alteration, the refractive index of the altered region 31 becomes lower than the surrounding refractive index. The emission of the femtosecond laser light L is carried out while scanning along the optical waveguide to be formed, and the altered region 31 is formed along the optical waveguide to be formed. The altered region 31 has a shape whose longitudinal direction is the first direction, which is the irradiation direction, when viewed in the cross section. The altered region 31 is an exemplary first region. FIG. 13 corresponds to a cross-sectional view taken along line XIII-XIII defined in FIG. 12.

Figure 14:
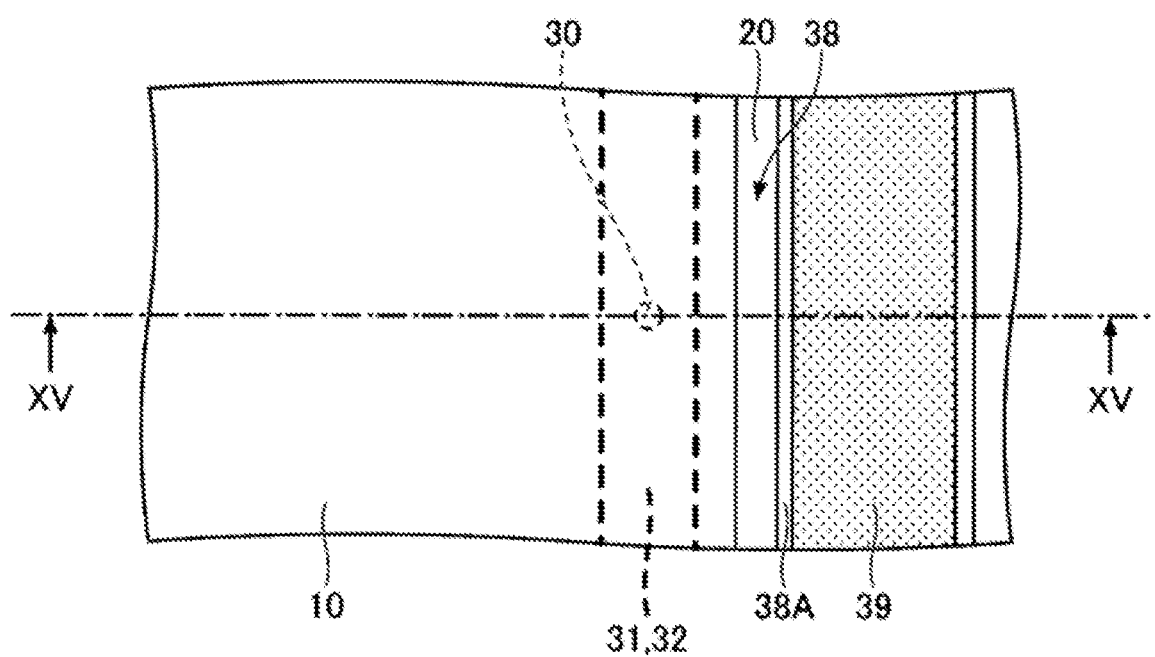
FIG. 14 is a diagram (part 8) illustrating the method of manufacturing a quantum circuit according to the first embodiment.
Figure 15:
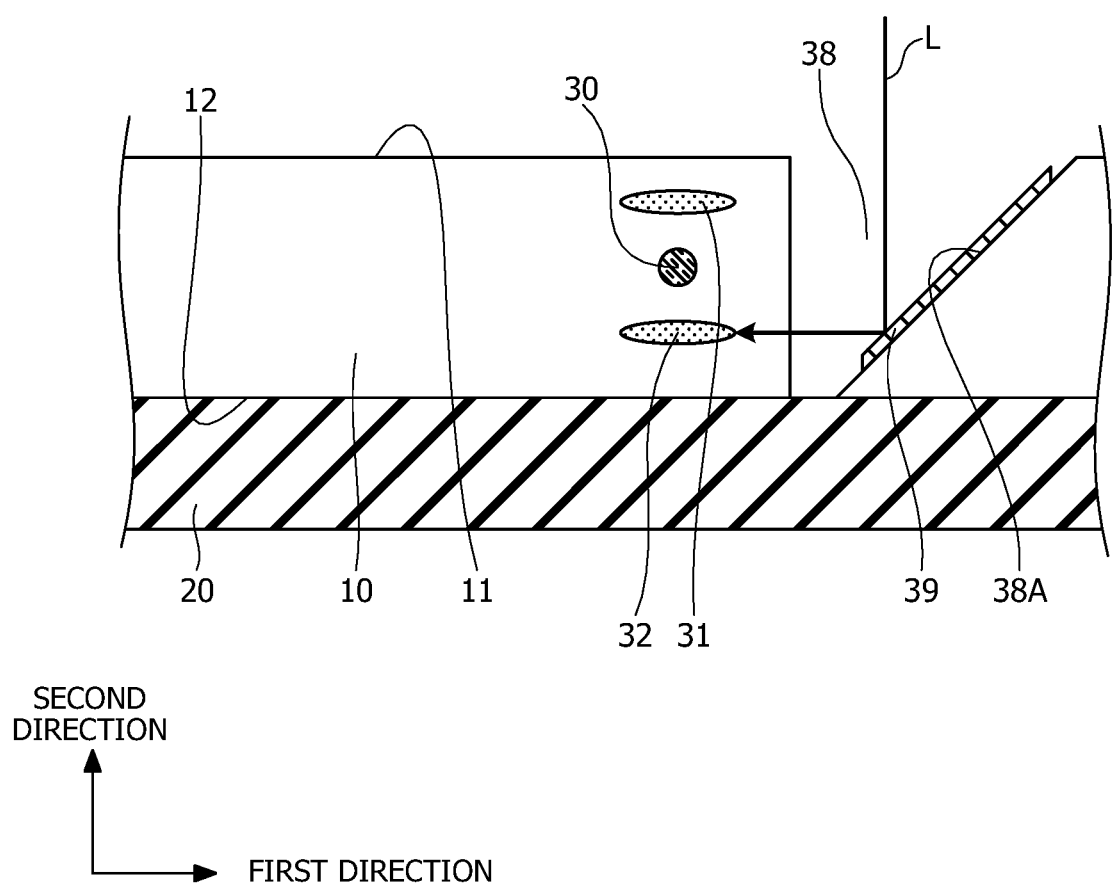
FIG. 15 is a diagram (part 9) illustrating the method of manufacturing a quantum circuit according to the first embodiment.

Next, as illustrated in FIGS. 14 and 15, the femtosecond laser light L is emitted to another part of the reflective film 39, and the femtosecond laser light L reflected by the reflective film 39 is concentrated onto the second principal surface 12 side of the color center 30. As a result, the portion of the diamond layer 10 at which the femtosecond laser light L is concentrated is altered, thereby forming an altered region 32. Along with the alteration, the refractive index of the altered region 32 becomes lower than the surrounding refractive index. The emission of the femtosecond laser light L is carried out while scanning along the optical waveguide to be formed, and the altered region 32 is formed along the optical waveguide to be formed. The altered region 32 has a shape whose longitudinal direction is the first direction, which is the irradiation direction, when viewed in the cross section. The altered region 32 is an exemplary second region. FIG. 15 corresponds to a cross-sectional view taken along line XV-XV defined in FIG. 14.

Figure 16:
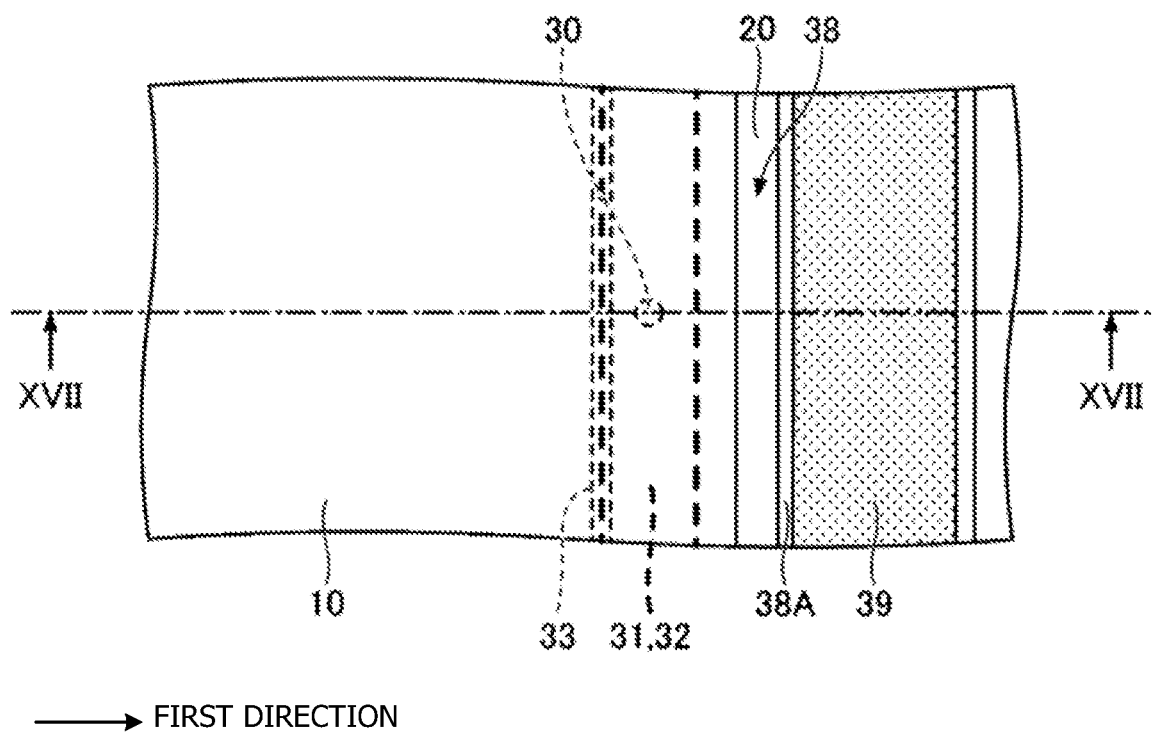
FIG. 16 is a diagram (part 10) illustrating the method of manufacturing a quantum circuit according to the first embodiment.
Figure 17:
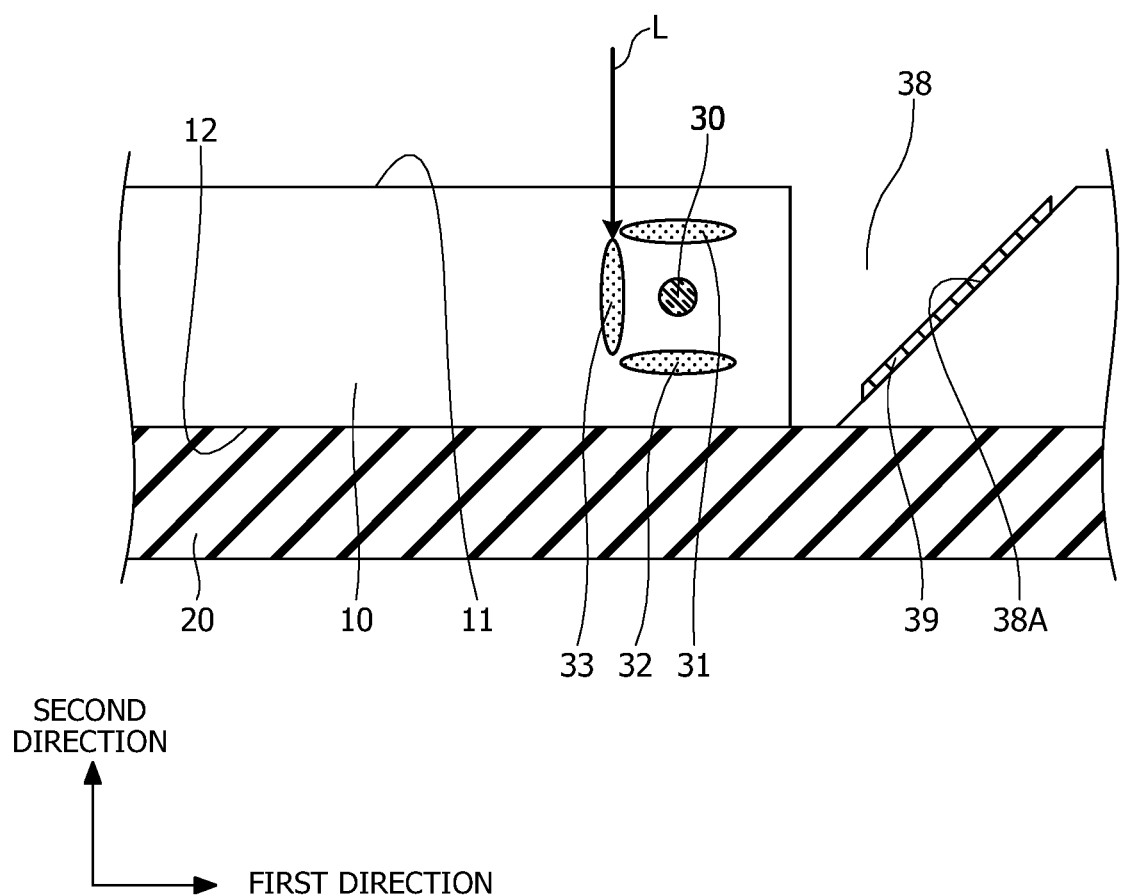
FIG. 17 is a diagram (part 11) illustrating the method of manufacturing a quantum circuit according to the first embodiment.

Thereafter, as illustrated in FIGS. 16 and 17, the femtosecond laser light L is emitted to a part of the first principal surface 11, and the femtosecond laser light L is concentrated onto one side of the color center 30 in the first direction. As a result, the portion of the diamond layer 10 at which the femtosecond laser light L is concentrated is altered, thereby forming an altered region 33. Along with the alteration, the refractive index of the altered region 33 becomes lower than the surrounding refractive index. The emission of the femtosecond laser light L is carried out while scanning along the optical waveguide to be formed, and the altered region 33 is formed along the optical waveguide to be formed. The altered region 33 has a shape whose longitudinal direction is the second direction, which is the irradiation direction, when viewed in the cross section. The altered region 33 is an exemplary third region. FIG. 17 corresponds to a cross-sectional view taken along line XVII-XVII defined in FIG. 16.

Figure 18:
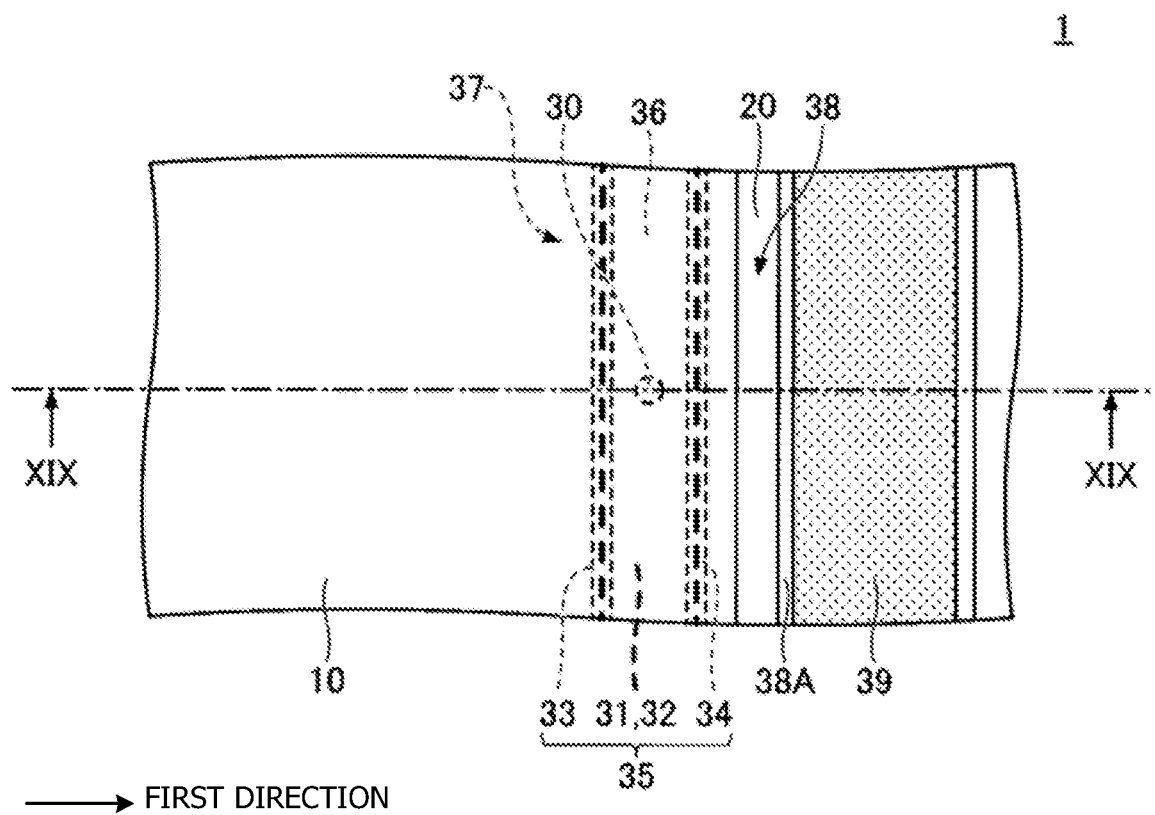
FIG. 18 is a diagram (part 12) illustrating the method of manufacturing a quantum circuit according to the first embodiment.
Figure 19:
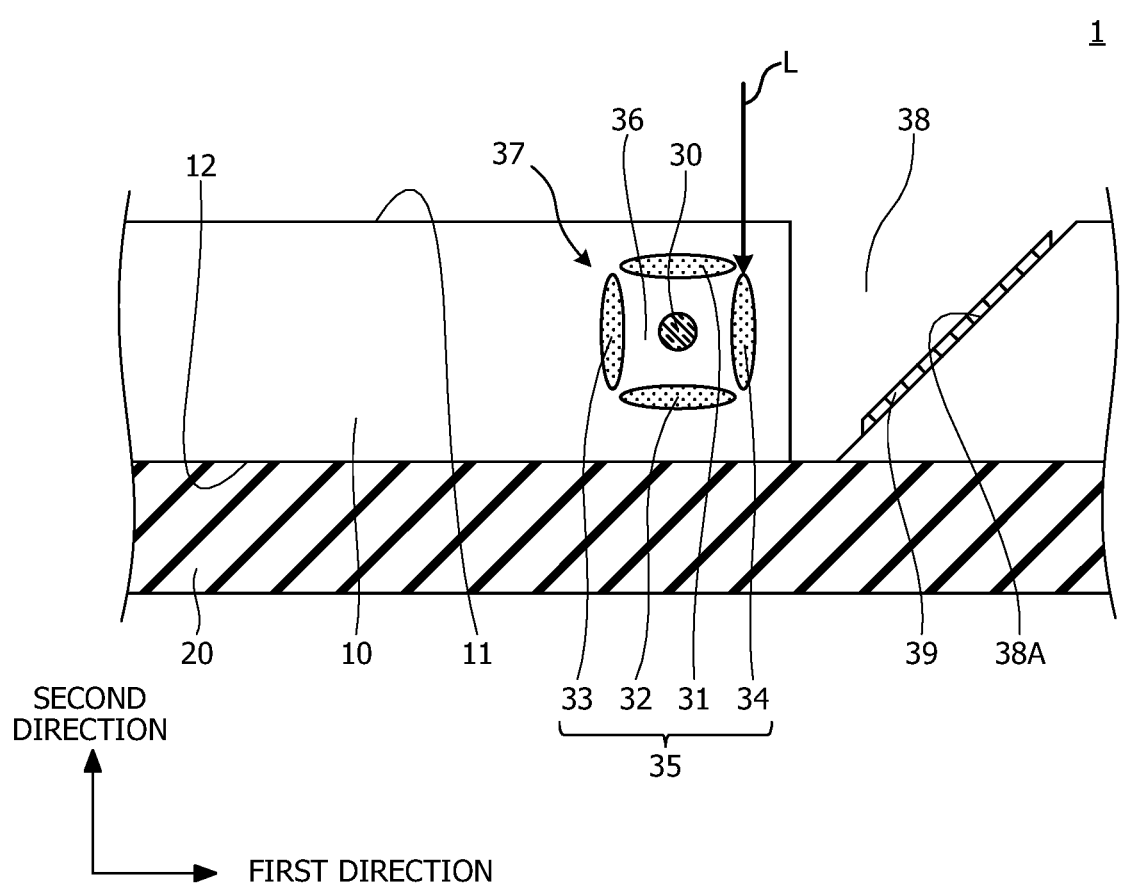
FIG. 19 is a diagram (part 13) illustrating the method of manufacturing a quantum circuit according to the first embodiment.

Subsequently, as illustrated in FIGS. 18 and 19, the femtosecond laser light L is emitted to another part of the first principal surface 11, and the femtosecond laser light L is concentrated onto the other side of the color center 30 in the first direction. As a result, the portion of the diamond layer 10 at which the femtosecond laser light L is concentrated is altered, thereby forming an altered region 34. Along with the alteration, the refractive index of the altered region 34 becomes lower than the surrounding refractive index. The emission of the femtosecond laser light L is carried out while scanning along the optical waveguide to be formed, and the altered region 34 is formed along the optical waveguide to be formed. The altered region 34 has a shape whose longitudinal direction is the second direction, which is the irradiation direction, when viewed in the cross section. The altered region 34 is an exemplary fourth region. FIG. 19 corresponds to a cross-sectional view taken along line XIX-XIX defined in FIG. 18.

Exemplary conditions for emitting the femtosecond laser light L at the time of forming the altered regions 31 to 34 are as follows. That is, a wavelength is 800 nm, a pulse width is 50 fs to 100 fs, pulse energy is 50 nJ to 1,000 nJ, and a repetition frequency is 250 kHz to 500 KHz.

As described above, the emission of the femtosecond laser light L is carried out while scanning. Thus, as illustrated in FIG. 19, the altered regions 31 to 34 are formed in a linear shape to surround the color center 30 when viewed in the cross section, for example. The refractive index of the region surrounded by the altered regions 31 to 34 is higher than the refractive index of the altered regions 31 to 34. Therefore, the altered regions 31 to 34 exert an optical confinement effect on the region surrounded by the altered regions 31 to 34. That is, an optical waveguide 37 having a core region 36 surrounded by the altered regions 31 to 34 and an optical confinement region 35 including the altered regions 31 to 34 is formed.

In this manner, it becomes possible to produce a quantum circuit 1 including the optical waveguide 37 optically coupled to the color center 30.

Note that the order of forming the altered regions 31 to 34 is not particularly limited. For example, the altered regions 31 and 32 may be formed after the altered regions 33 and 34 are formed.

In the quantum circuit 1, the altered regions 31 and 32 have a shape whose longitudinal direction is the first direction when viewed in the cross section, and the altered regions 33 and 34 have a shape whose longitudinal direction is the second direction when viewed in the cross section. That is, the dimensions of the altered regions 31 and 32 in the first direction are larger than the dimensions in the second direction, and the dimensions of the altered regions 33 and 34 in the second direction are larger than the dimensions in the first direction. Therefore, the altered regions 31 and 32 may confine the light in the core region 36 in the second direction, and the altered regions 33 and 34 may confine the light in the core region 36 in the first direction. Thus, it becomes possible to couple emitted light from the color center 30 to the optical waveguide 37 highly efficiently, and to reduce a loss of optical signals propagating through the optical waveguide 37.

Furthermore, when the quantum circuit 1 is produced, the groove 38 having the side surface 38A is formed, and the reflective film 39 is formed over the side surface 38A, whereby the femtosecond laser light L may be concentrated onto a desired position through the reflective film 39 from the first direction.

Figure 20:
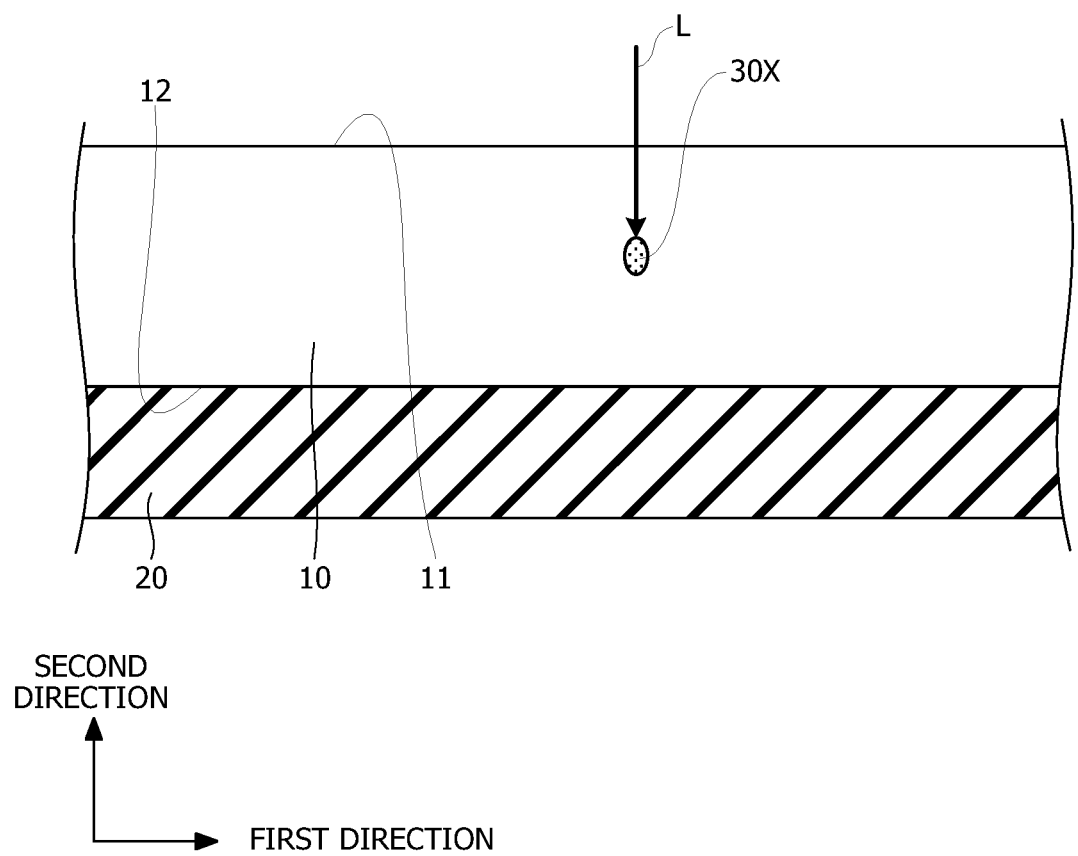
FIG. 20 is a diagram (part 1) illustrating a method of forming a color center.
Figure 21:
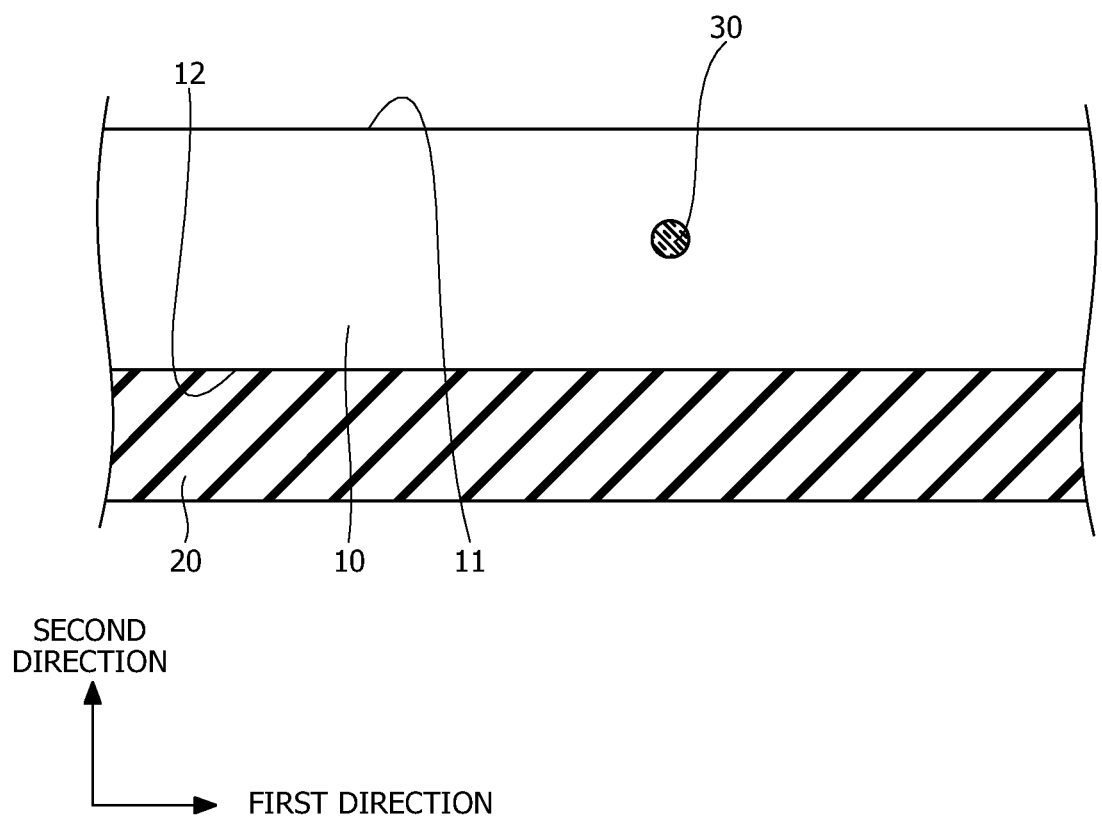
FIG. 21 is a diagram (part 2) illustrating the method of forming a color center.

The color center 30 may be intentionally formed. FIGS. 20 and 21 are diagrams illustrating a method of forming the color center 30. FIGS. 20 and 21 are cross-sectional views. As illustrated in FIG. 20, single-shot femtosecond laser light L is concentrated to the diamond layer 10 to form a vacancy 30X. Next, annealing is performed in a nitrogen atmosphere to form, as the color center 30, an NV center in which the vacancy 30X and a nitrogen atom are paired, as illustrated in FIG. 21. Exemplary annealing conditions are as follows. That is, a temperature is 1,000° C., and a time is 3 hours.

Second Embodiment

Figure 22:
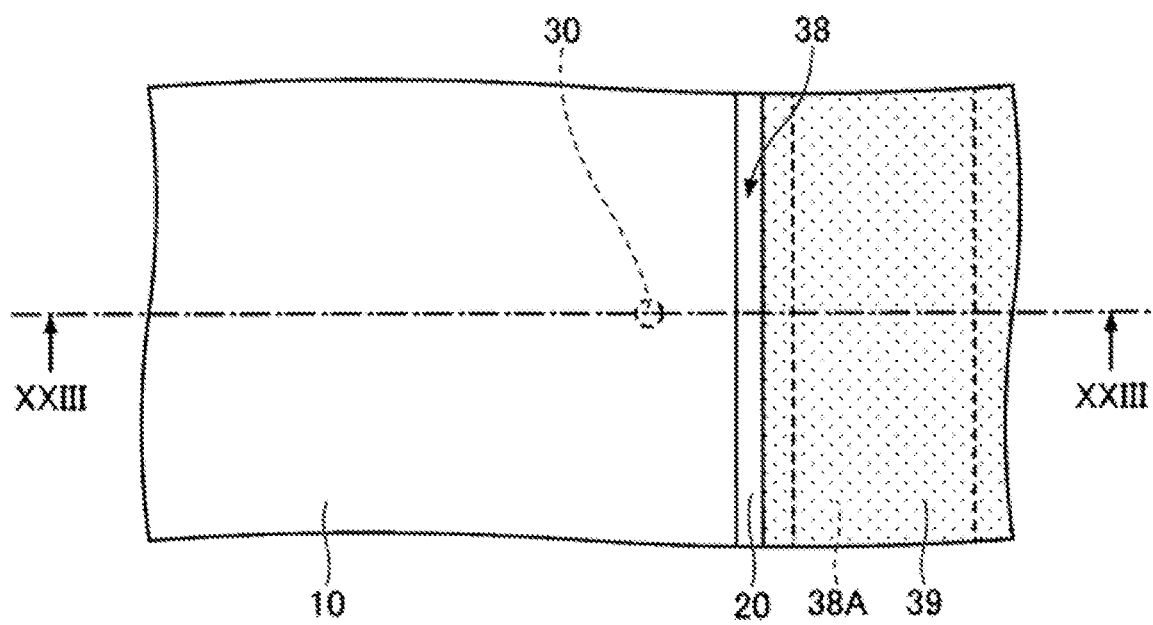
FIG. 22 is a diagram (part 1) illustrating a method of manufacturing a quantum circuit according to a second embodiment.
Figure 23:
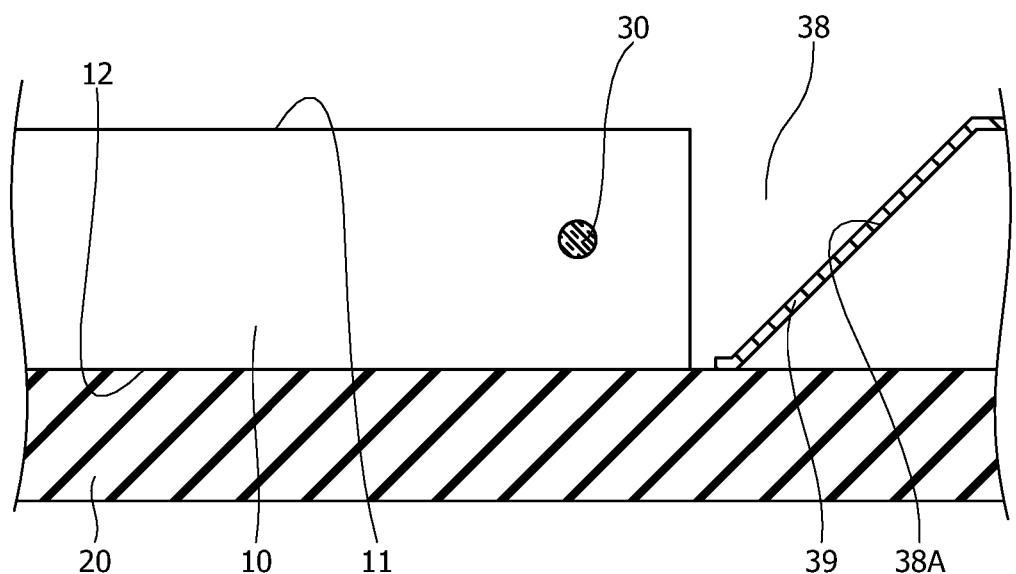
FIG. 23 is a diagram (part 2) illustrating the method of manufacturing a quantum circuit according to the second embodiment.
Figure 24:
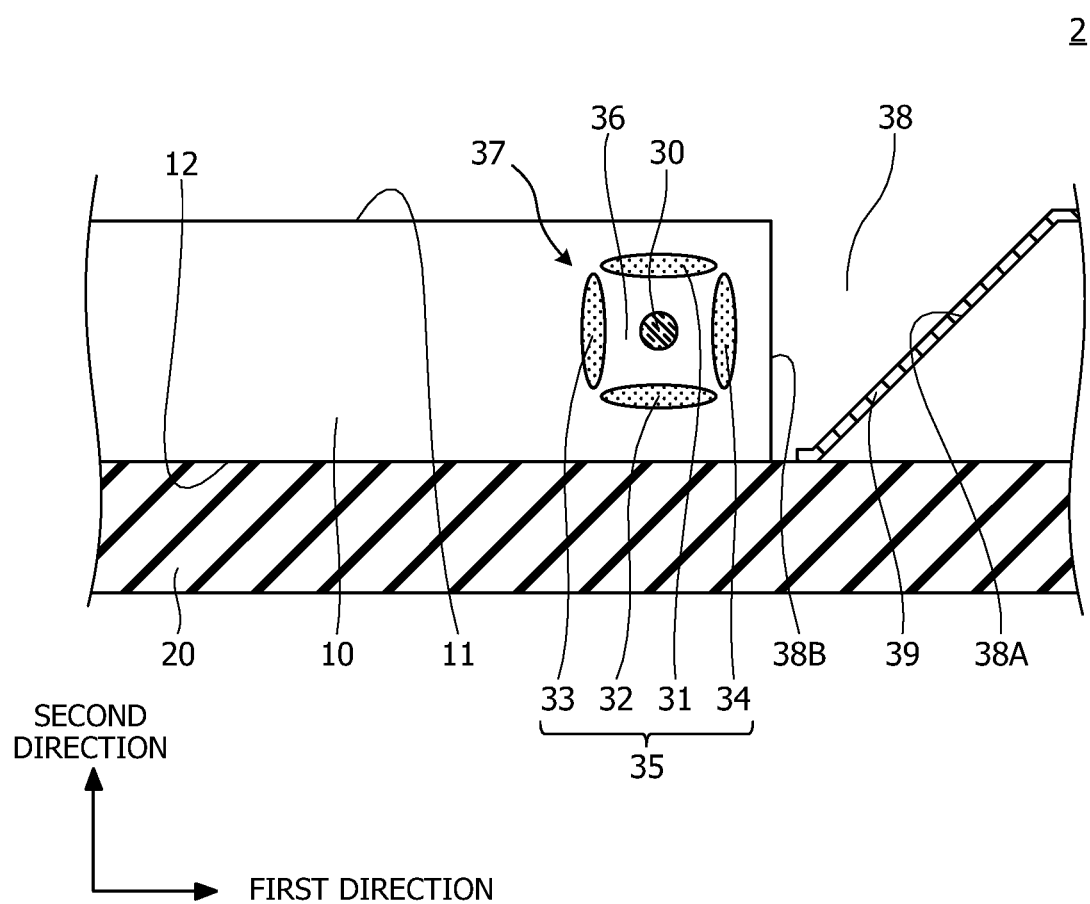
FIG. 24 is a diagram (part 3) illustrating the method of manufacturing a quantum circuit according to the second embodiment.

Next, a second embodiment will be described. The second embodiment is different from the first embodiment mainly in arrangement of a reflective film. FIGS. 22 to 24 are diagrams illustrating a method of manufacturing a quantum circuit according to the second embodiment. FIG. 22 is a top view, and FIGS. 23 and 24 are cross-sectional views.

In the second embodiment, first, a process up to formation of a groove 38 is performed in a similar manner to the first embodiment (see FIGS. 8 and 9). Next, as illustrated in FIGS. 22 and 23, a reflective film 39 is formed over a side surface 38A, over a surface of a base material 20 exposed at the bottom of the groove 38, and over a first principal surface 11 connected to the side surface 38A.

Thereafter, as illustrated in FIG. 24, altered regions 31 to 34 are formed in a similar manner to the first embodiment.

In this manner, it becomes possible to produce a quantum circuit 2 including an optical waveguide 37 optically coupled to a color center 30.

Effects similar to those of the first embodiment may also be exerted by the second embodiment. Furthermore, since the reflective film 39 is also formed over the surface of the base material 20 exposed at the bottom of the groove 38 and over the first principal surface 11 connected to the side surface 38A, it becomes possible to expand the range in which the altered regions 31 and 32 may be formed in a thickness direction of a diamond layer 10.

Third Embodiment

Next, a third embodiment will be described. The third embodiment is different from the first embodiment mainly in the number of color centers and optical waveguides. FIGS. 25 to 30 are diagrams illustrating a method of manufacturing a quantum circuit according to the third embodiment. FIGS. 25, 27, 29, and 30 are cross-sectional views, and FIGS. 26 and 28 are top views. In the third embodiment, in a diamond layer including two color centers, two optical waveguides individually and optically coupled to the color centers are formed.

Figure 25:
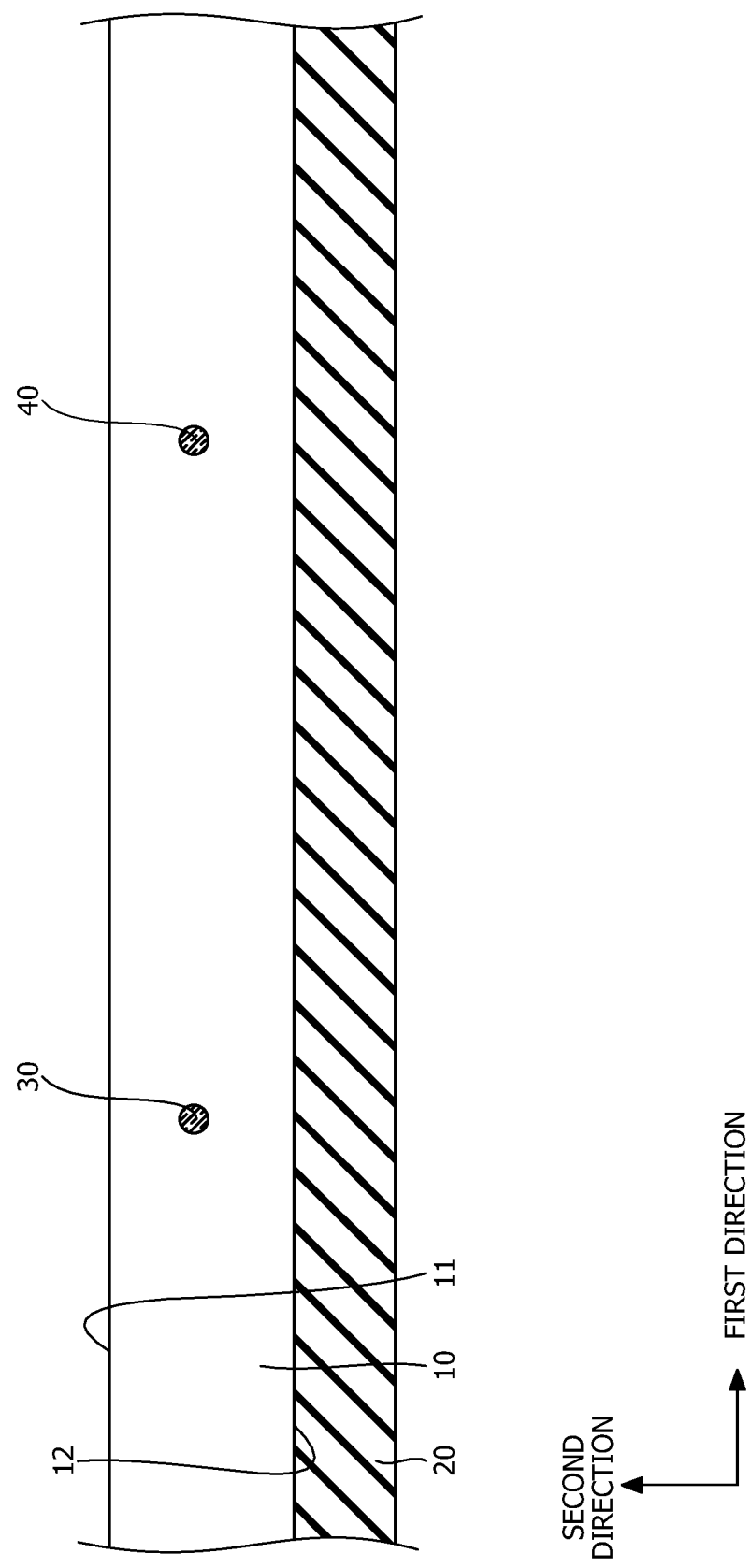
FIG. 25 is a diagram (part 1) illustrating a method of manufacturing a quantum circuit according to a third embodiment.
Figure 26:
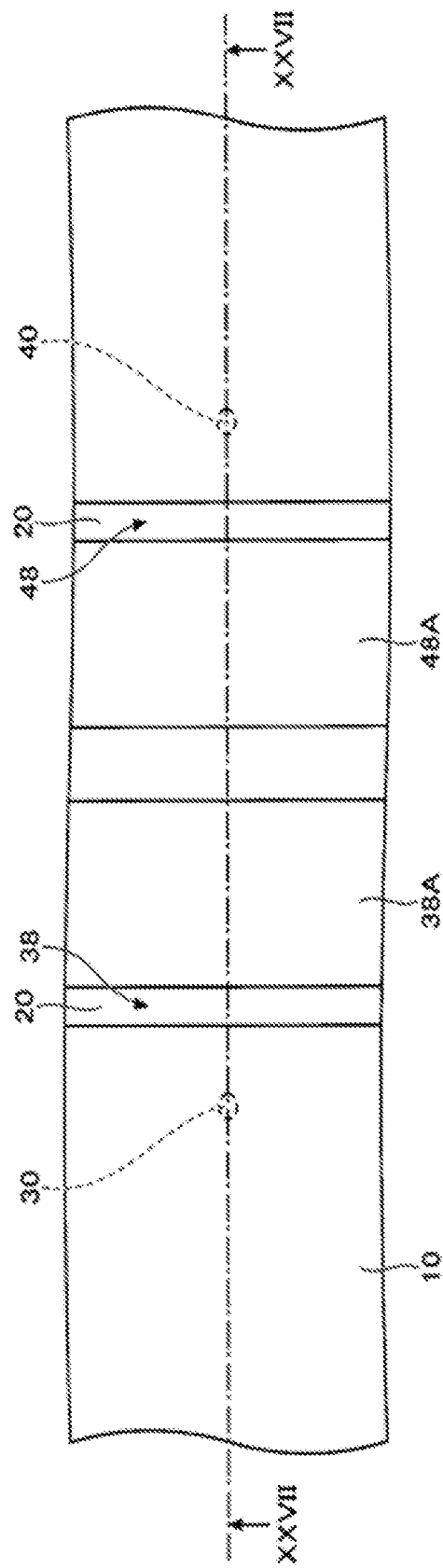
FIG. 26 is a diagram (part 2) illustrating the method of manufacturing a quantum circuit according to the third embodiment.

In the third embodiment, first, as illustrated in FIG. 25, a diamond layer 10 formed over a base material 20 is prepared such that color centers 30 and 40 formed apart in a first direction are included therein. The color center 40 is, in a similar manner to the color center 30, an NV center, SiV center, GeV center, SnV center, PbV center, or BV center, for example.

Figure 27:
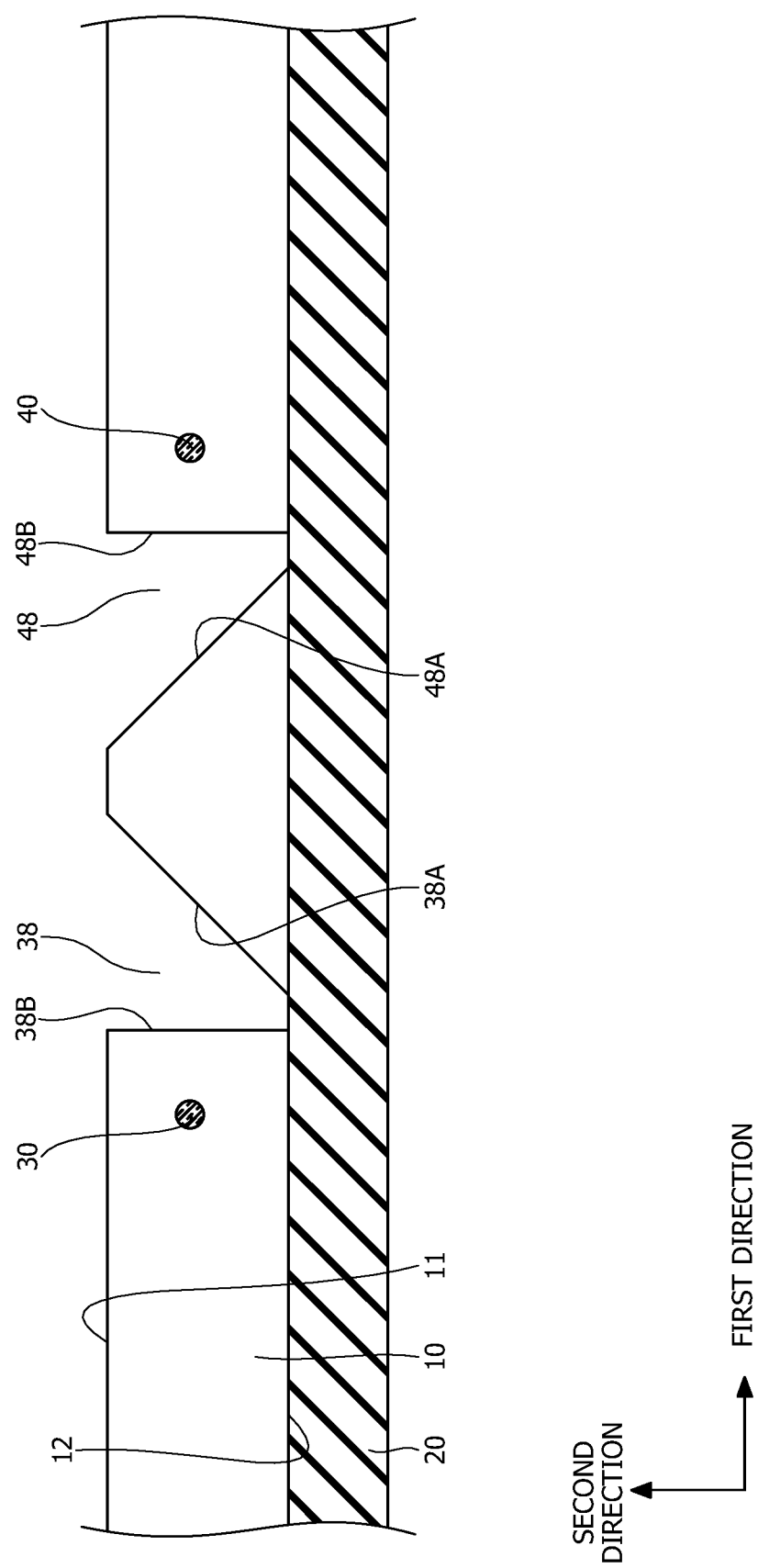
FIG. 27 is a diagram (part 3) illustrating the method of manufacturing a quantum circuit according to the third embodiment.
Figure 28:
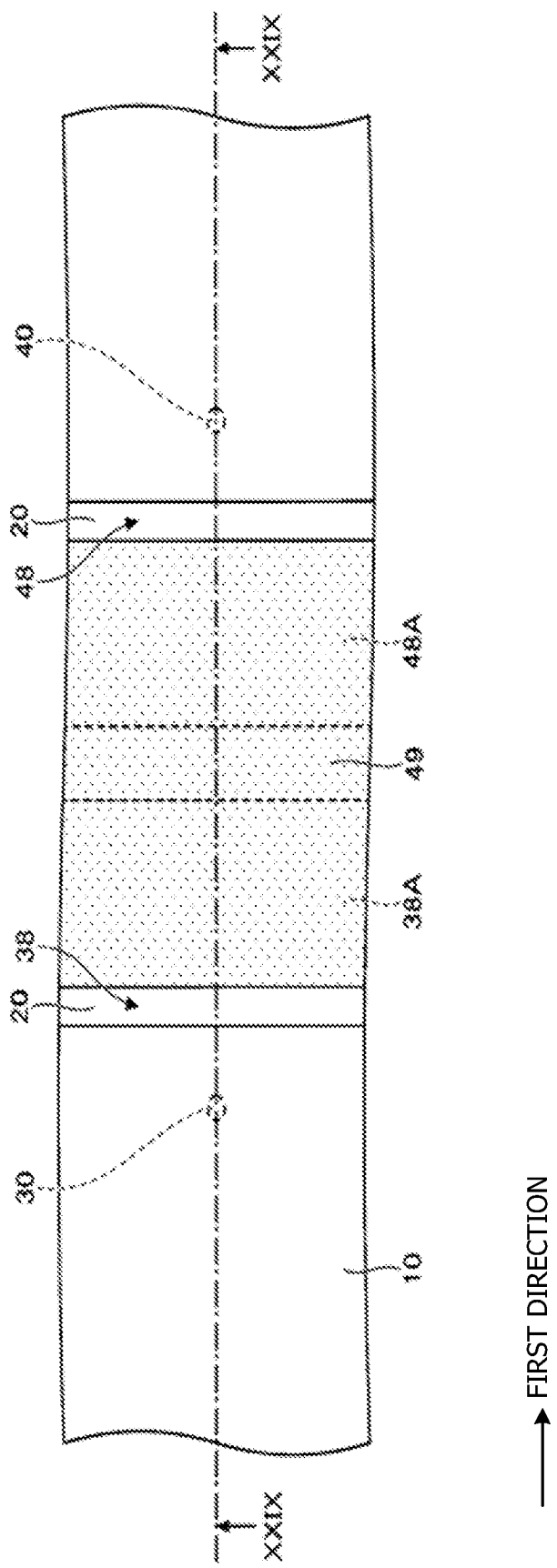
FIG. 28 is a diagram (part 4) illustrating the method of manufacturing a quantum circuit according to the third embodiment.

Next, as illustrated in FIGS. 26 and 27, a groove 38 away from the color center 30 and a groove 48 away from the color center 40 are formed in the diamond layer 10. The grooves 38 and 48 are formed along the optical waveguides to be formed. For example, the grooves 38 and 48 are formed between the color center 30 and the color center 40 in the first direction, the groove 38 is formed on the side closer to the color center 30 than the groove 48, and the groove 48 is formed on the side closer to the color center 40 than the groove 38. The groove 48 has, for example, a side surface 48A inclined with respect to a first principal surface 11, and a side surface 48B perpendicular to the first principal surface 11. The side surface 48B is positioned between the color center 40 and the side surface 48A. The side surface 48A may be visually identified from the first principal surface 11 side, and is formed to be inclined with respect to the first principal surface 11 by, for example, 40 to 50 degrees, preferably 45 degrees. The side surface 48A is an exemplary inclined surface. FIG. 27 corresponds to a cross-sectional view taken along line XXVII-XXVII defined in FIG. 26.

Figure 29:
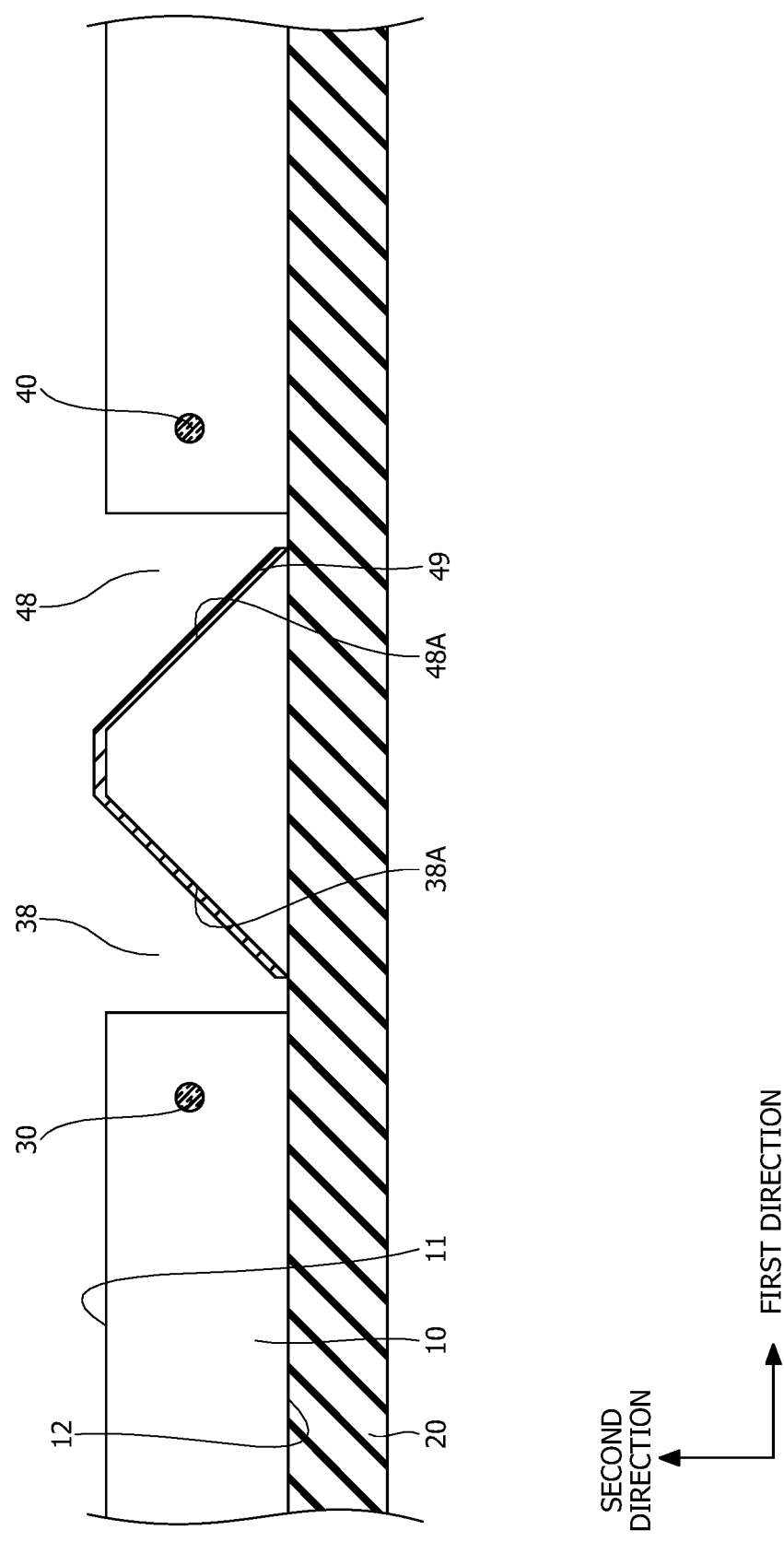
FIG. 29 is a diagram (part 5) illustrating the method of manufacturing a quantum circuit according to the third embodiment.

Thereafter, as illustrated in FIGS. 28 and 29, a reflective film 49 that reflects femtosecond laser light is formed over the side surface 38A, over the side surface 48A, and over the first principal surface 11 connected to the side surface 38A and the side surface 48A. The reflective film 49 is formed along the optical waveguide to be formed. The reflective film 49 is, for example, a film made of metal such as Au, Al, or the like. Although the thickness of the reflective film 49 is not particularly limited, it is, for example, approximately 0.1 μm to 1.0 μm. The reflective film 49 may be formed by, for example, a lift-off method. FIG. 29 corresponds to a cross-sectional view taken along line XXIX-XXIX defined in FIG. 28.

Figure 30:
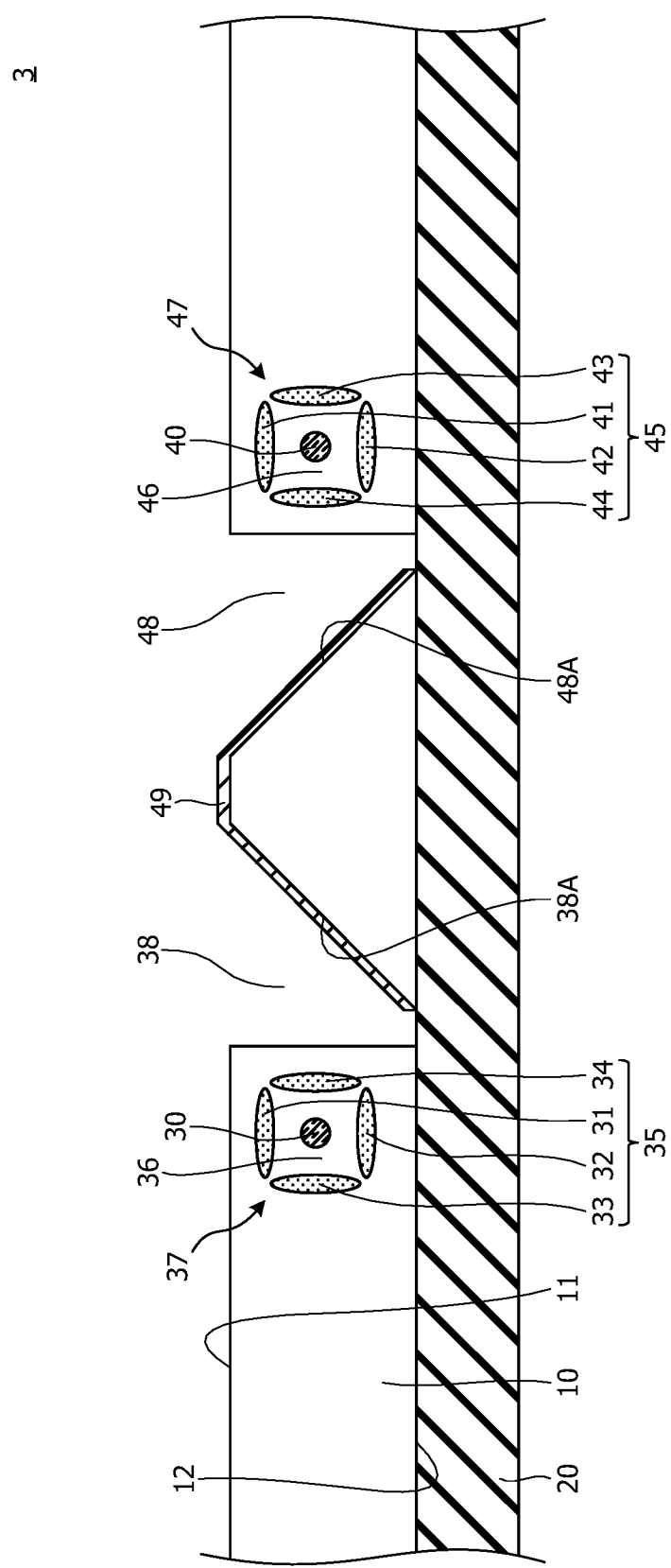
FIG. 30 is a diagram (part 6) illustrating the method of manufacturing a quantum circuit according to the third embodiment.

Subsequently, as illustrated in FIG. 30, altered regions 31 to 34 are formed in a similar manner to the first embodiment. Furthermore, altered regions 41 to 44 are formed in a similar manner to the formation of the altered regions 31 to 34, respectively. The altered regions 41 to 44 are formed in a linear shape to surround the color center 40 when viewed in the cross section, for example. The refractive index of the region surrounded by the altered regions 41 to 44 is higher than the refractive index of the altered regions 41 to 44. Therefore, the altered regions 41 to 44 exert an optical confinement effect on the region surrounded by the altered regions 41 to 44. That is, an optical waveguide 47 having a core region 46 surrounded by the altered regions 41 to 44 and an optical confinement region 45 including the altered regions 41 to 44 is formed.

In this manner, it becomes possible to produce a quantum circuit 3 including an optical waveguide 37 optically coupled to the color center 30 and the optical waveguide 47 optically coupled to the color center 40.

Note that the order of forming the altered regions 31 to 34 and 41 to 44 is not particularly limited.

Effects similar to those of the first embodiment may also be exerted by the third embodiment. Furthermore, it becomes possible to reduce a loss of optical signals propagating through the optical waveguide 47. Moreover, the number of quantum bits included in the quantum circuit 3 may be easily increased.

Furthermore, when the quantum circuit 3 is produced, the grooves 38 and 48 may be formed simultaneously. Furthermore, reflective films may be separately formed over the side surfaces 38A and 48A, and even in that case, the reflective films may be formed over the side surface 38A and over the side surface 48A simultaneously.

Fourth Embodiment

Next, a fourth embodiment will be described. The fourth embodiment is different from the third embodiment mainly in arrangement of grooves and reflective films. FIGS. 31 to 36 are diagrams illustrating a method of manufacturing a quantum circuit according to the fourth embodiment. FIGS. 31, 33, 35, and 36 are cross-sectional views, and FIGS. 32 and 34 are top views. In the fourth embodiment, in a diamond layer including two color centers, two optical waveguides individually and optically coupled to the color centers are formed in a similar manner to the third embodiment.

Figure 31:
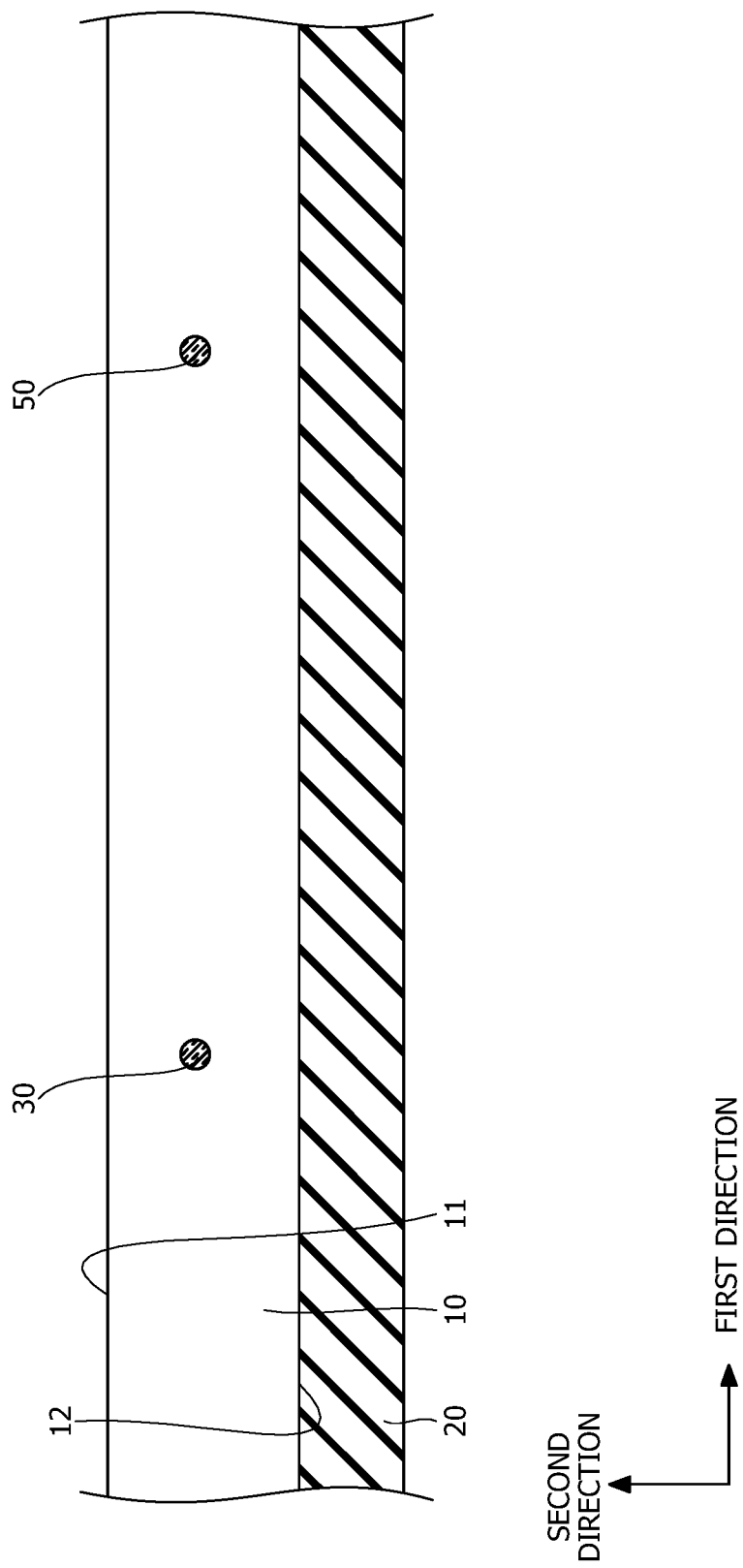
FIG. 31 is a diagram (part 1) illustrating a method of manufacturing a quantum circuit according to a fourth embodiment.
Figure 32:
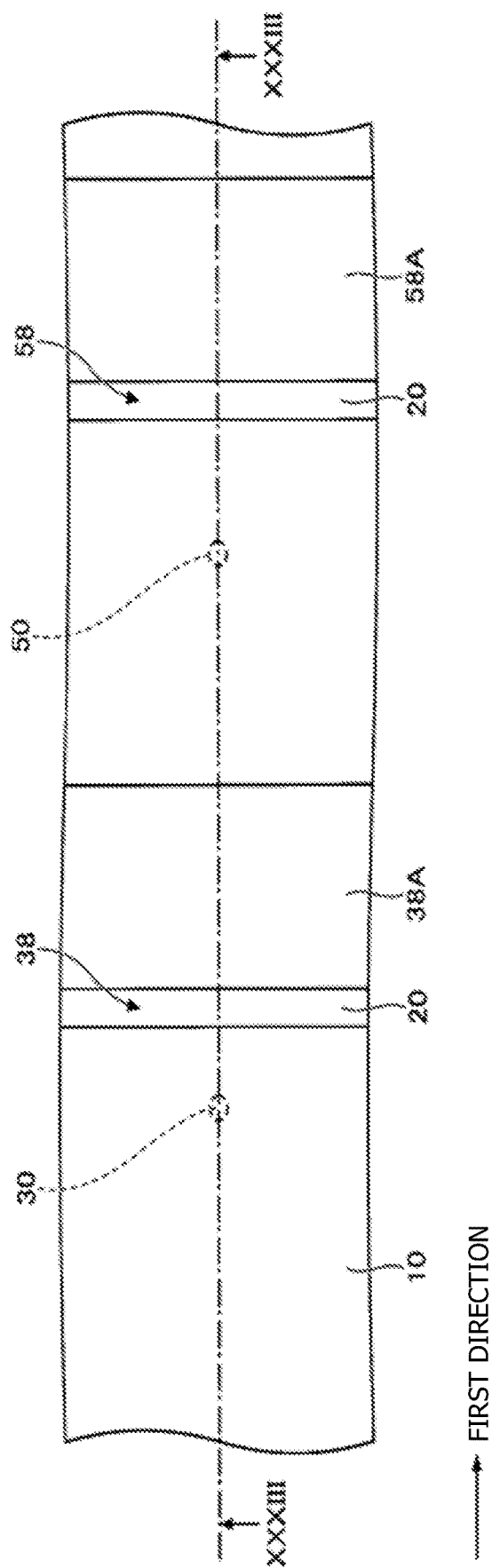
FIG. 32 is a diagram (part 2) illustrating the method of manufacturing a quantum circuit according to the fourth embodiment.

In the fourth embodiment, first, as illustrated in FIG. 31, a diamond layer 10 formed over a base material 20 is prepared such that color centers 30 and 50 formed apart in a first direction are included therein. The color center 50 is, in a similar manner to the color center 30, an NV center, SiV center, GeV center, SnV center, PbV center, or BV center, for example.

Figure 33:
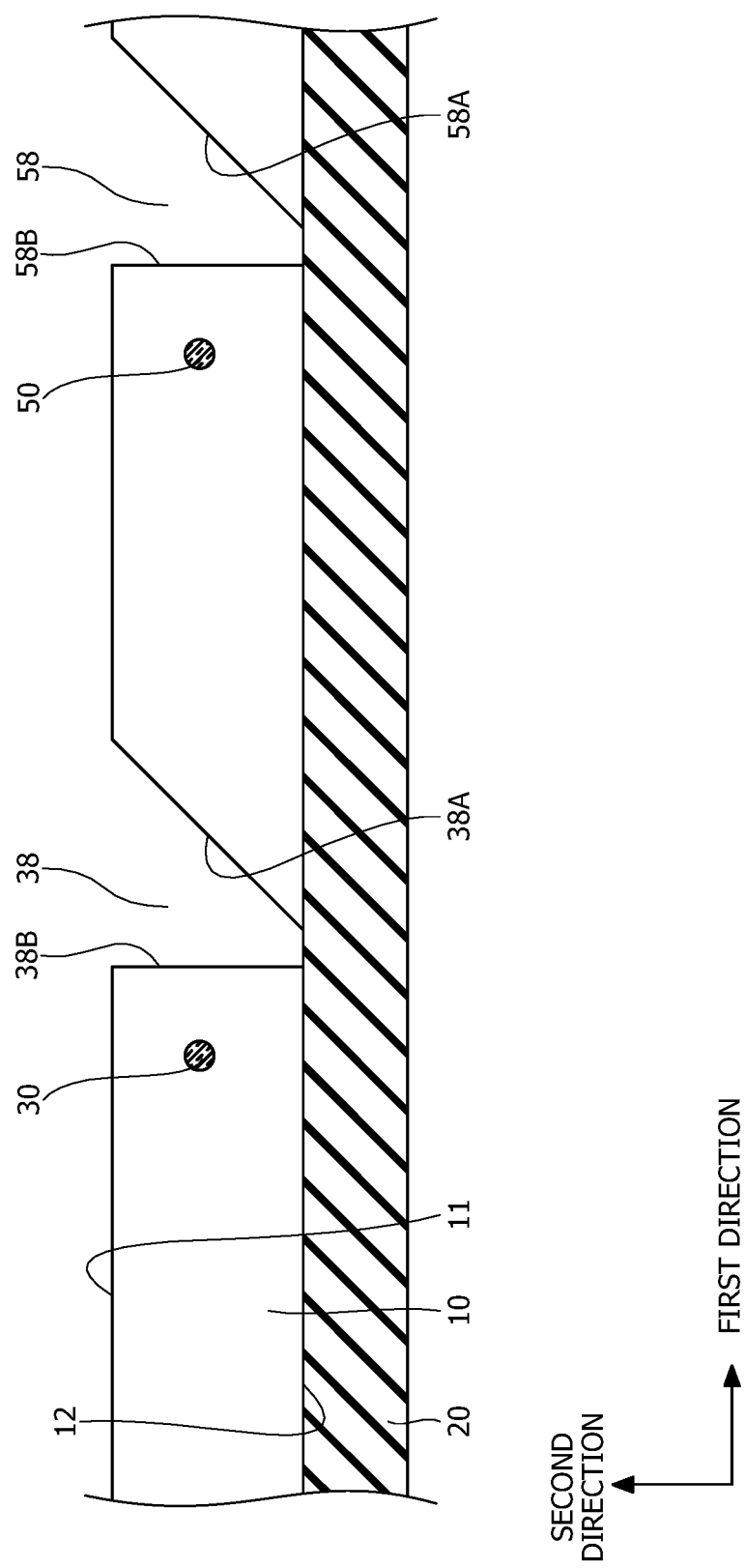
FIG. 33 is a diagram (part 3) illustrating the method of manufacturing a quantum circuit according to the fourth embodiment.
Figure 34:
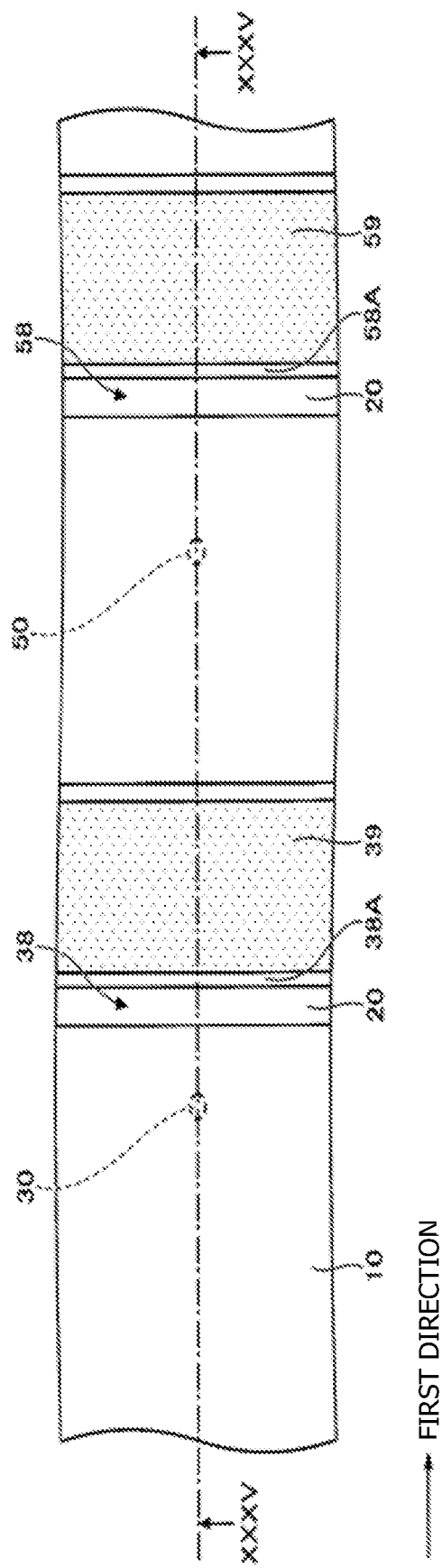
FIG. 34 is a diagram (part 4) illustrating the method of manufacturing a quantum circuit according to the fourth embodiment.

Next, as illustrated in FIGS. 32 and 33, a groove 38 away from the color center 30 and a groove 58 away from the color center 50 are formed in the diamond layer 10. The grooves 38 and 58 are formed along the optical waveguides to be formed. For example, the groove 38 is formed between the color center 30 and the color center 50 in the first direction, and the groove 58 is formed further from the groove 38 than the color center 50. The groove 58 has, for example, a side surface 58A inclined with respect to a first principal surface 11, and a side surface 58B perpendicular to the first principal surface 11. The side surface 58B is positioned between the color center 50 and the side surface 58A. The side surface 58A may be visually identified from the first principal surface 11 side, and is formed to be inclined with respect to the first principal surface 11 by, for example, 40 to 50 degrees, preferably 45 degrees. The side surface 58A is an exemplary inclined surface. FIG. 33 corresponds to a cross-sectional view taken along line XXXIII-XXXIII defined in FIG. 32.

Figure 35:
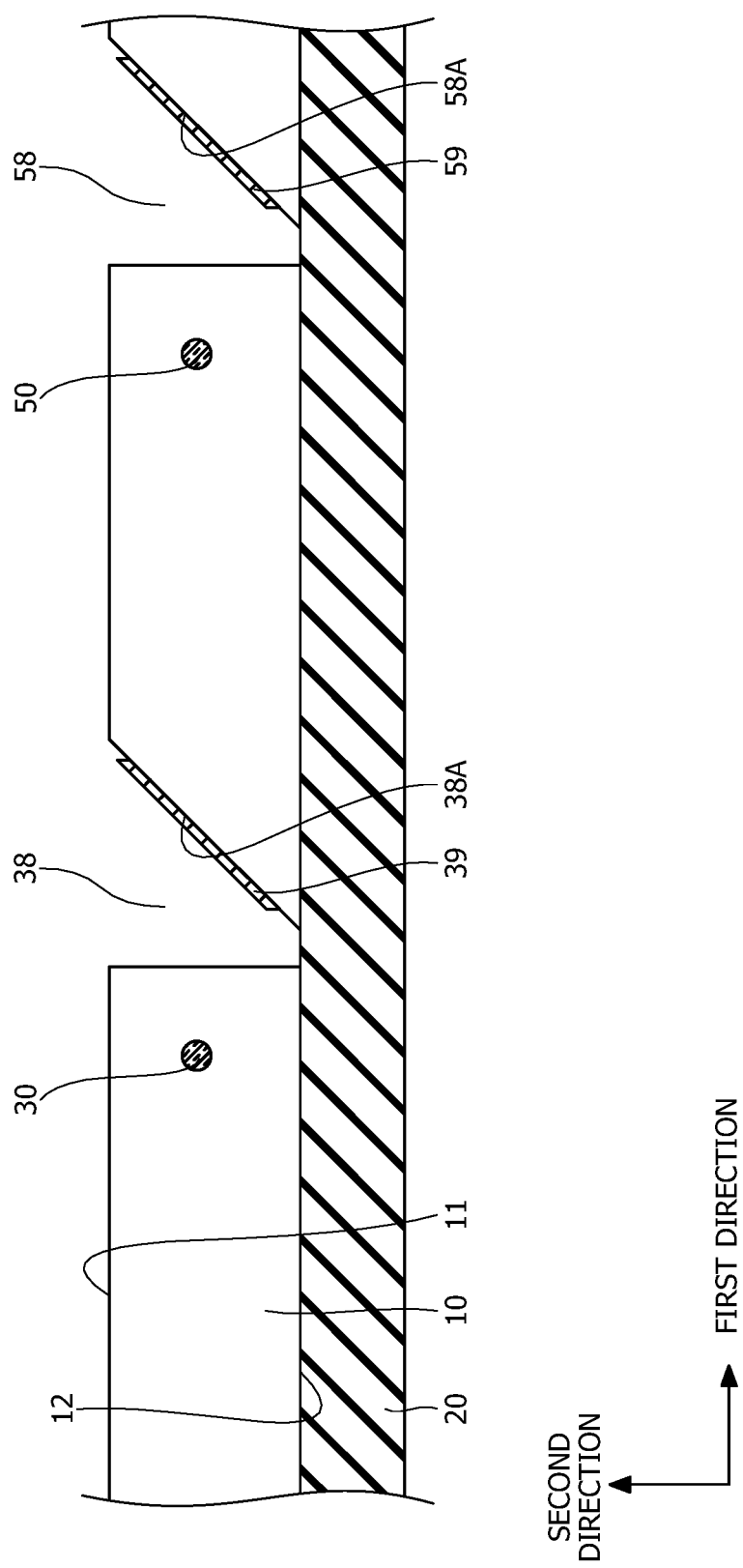
FIG. 35 is a diagram (part 5) illustrating the method of manufacturing a quantum circuit according to the fourth embodiment.

Thereafter, as illustrated in FIGS. 34 and 35, a reflective film 39 that reflects femtosecond laser light is formed over the side surface 38A, and a reflective film 59 that reflects femtosecond laser light is formed over the side surface 58A. Here, for example, the reflective film 39 is formed over a part of the side surface 38A, and the reflective film 59 is formed over a part of the side surface 58A. The reflective films 39 and 59 are formed along the optical waveguides to be formed. The reflective film 59 is, for example, a film made of metal such as Au, Al, or the like. Although the thickness of the reflective film 59 is not particularly limited, it is, for example, approximately 0.1 μm to 1.0 μm. The reflective film 59 may be formed by, for example, a lift-off method. The reflective films 39 and 59 may be formed simultaneously. FIG. 35 corresponds to a cross-sectional view taken along line XXXV-XXXV defined in FIG. 34.

Figure 36:
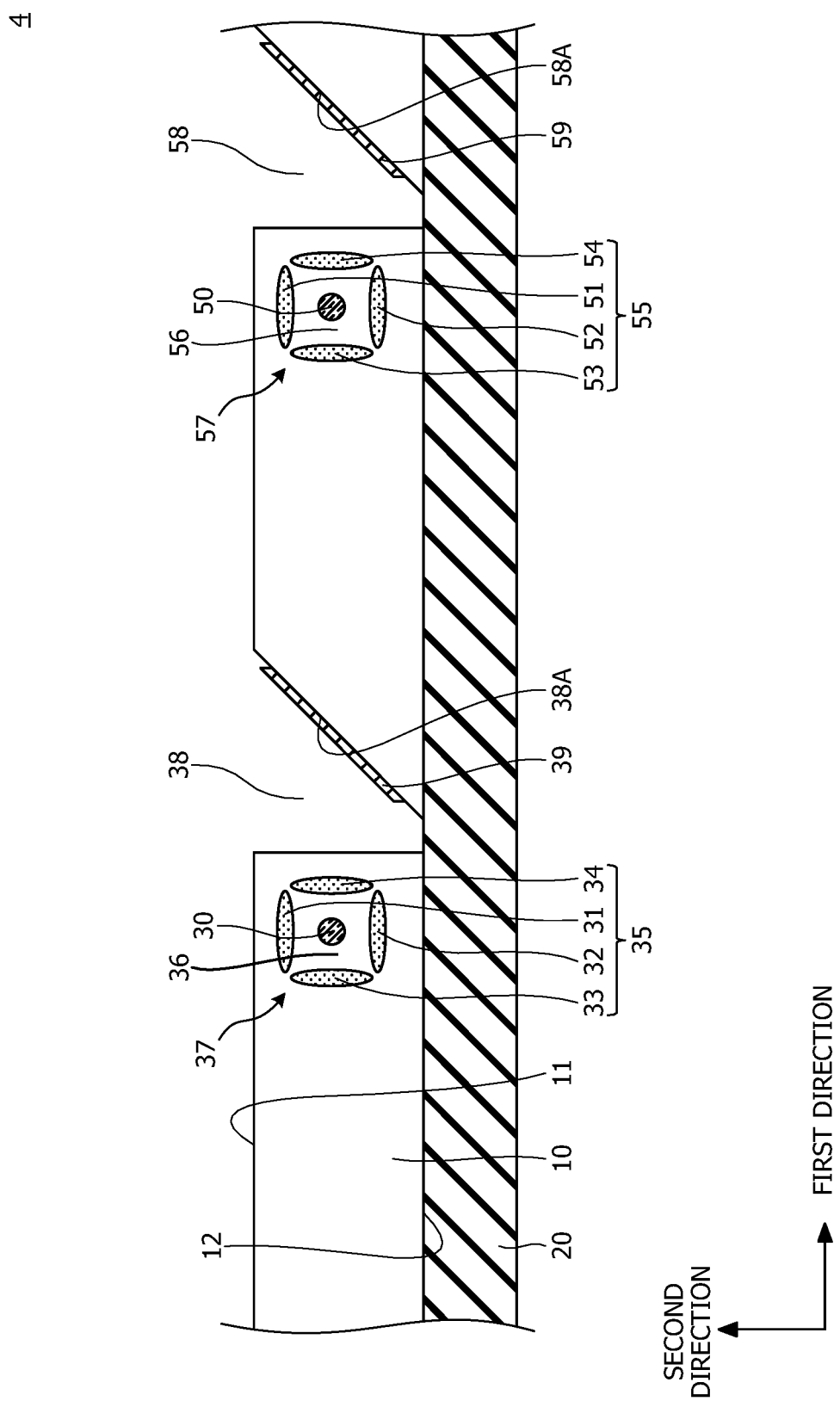
FIG. 36 is a diagram (part 6) illustrating the method of manufacturing a quantum circuit according to the fourth embodiment.

Subsequently, as illustrated in FIG. 36, altered regions 31 to 34 are formed in a similar manner to the first embodiment. Furthermore, altered regions 51 to 54 are formed in a similar manner to the formation of the altered regions 31 to 34, respectively. The altered regions 51 to 54 are formed in a linear shape to surround the color center 50 when viewed in the cross section, for example. The refractive index of the region surrounded by the altered regions 51 to 54 is higher than the refractive index of the altered regions 51 to 54. Therefore, the altered regions 51 to 54 exert an optical confinement effect on the region surrounded by the altered regions 51 to 54. That is, an optical waveguide 57 having a core region 56 surrounded by the altered regions 51 to 54 and an optical confinement region 55 including the altered regions 51 to 54 is formed.

In this manner, it becomes possible to produce a quantum circuit 4 including an optical waveguide 37 optically coupled to the color center 30 and the optical waveguide 57 optically coupled to the color center 50.

Note that the order of forming the altered regions 31 to 34 and 51 to 54 is not particularly limited.

Effects similar to those of the first embodiment may also be exerted by the fourth embodiment. Furthermore, it becomes possible to reduce a loss of optical signals propagating through the optical waveguide 57. Moreover, the number of quantum bits included in the quantum circuit 4 may be easily increased.

Furthermore, when the quantum circuit 4 is produced, the grooves 38 and 58 may be formed simultaneously, and the reflective films 39 and 59 may be formed simultaneously.

Fifth Embodiment

Next, a fifth embodiment will be described. The fifth embodiment is different from the first embodiment mainly in the number of color centers and optical waveguides. FIGS. 37 to 40 are diagrams illustrating a method of manufacturing a quantum circuit according to the fifth embodiment. FIGS. 37 to 40 are cross-sectional views. They are diagrams illustrating the method of manufacturing a quantum circuit according to the fifth embodiment. In the fifth embodiment, in a diamond layer including four color centers, four optical waveguides individually and optically coupled to the color centers are formed.

Figure 37:
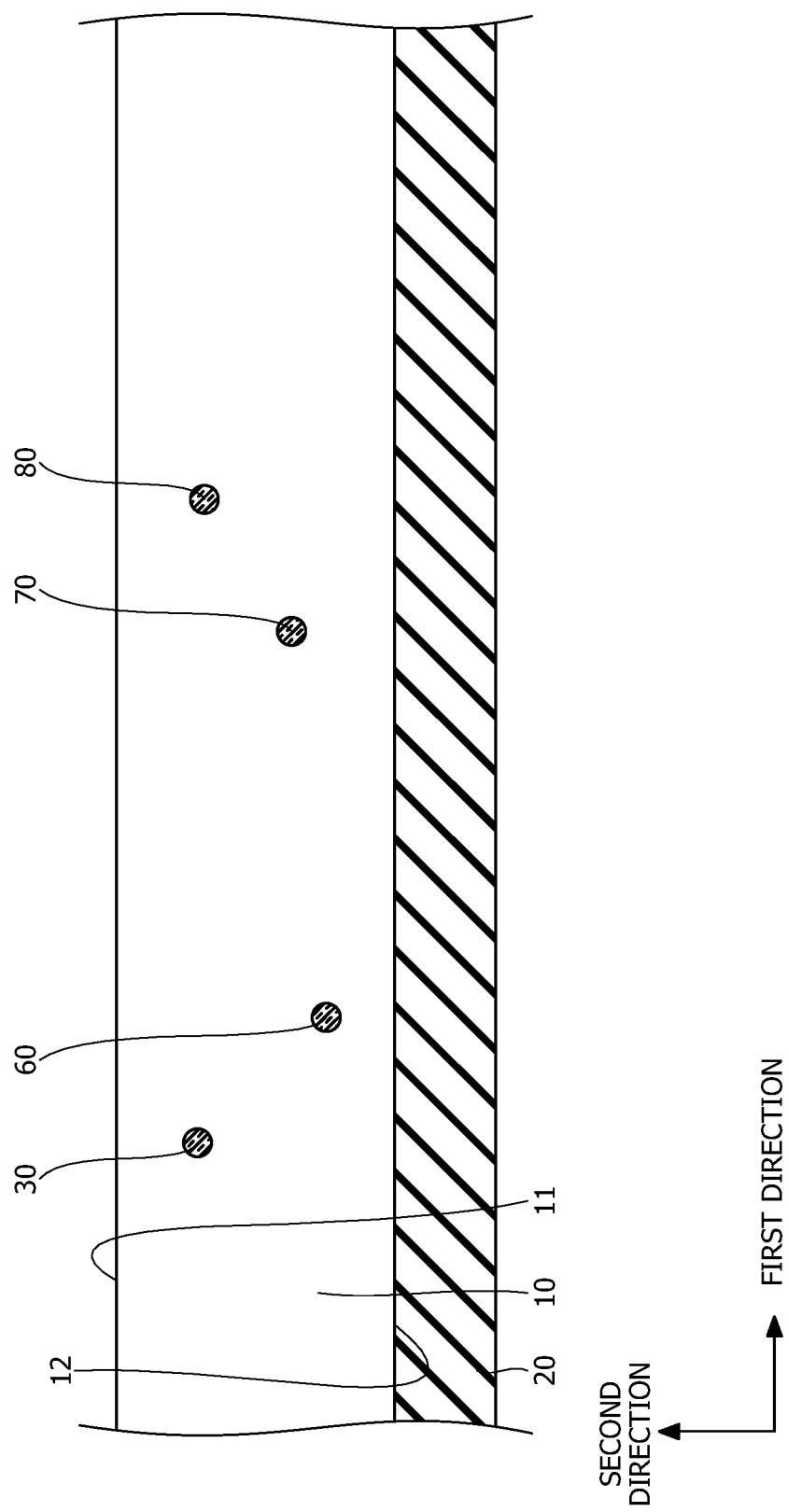
FIG. 37 is a diagram (part 1) illustrating a method of manufacturing a quantum circuit according to a fifth embodiment.

In the fifth embodiment, first, as illustrated in FIG. 37, a diamond layer 10 formed over a base material 20 is prepared such that color centers 30, 60, 70, and 80 formed apart in a first direction are included therein. The color centers 60, 70, and 80 are, in a similar manner to the color center 30, an NV center, SiV center, GeV center, SnV center, PbV center, or BV center, for example. Here, it is assumed that, in the first direction, the color center 30 and the color center 60 are positioned close to each other and the color center 70 and the color center 80 are positioned close to each other.

Figure 38:
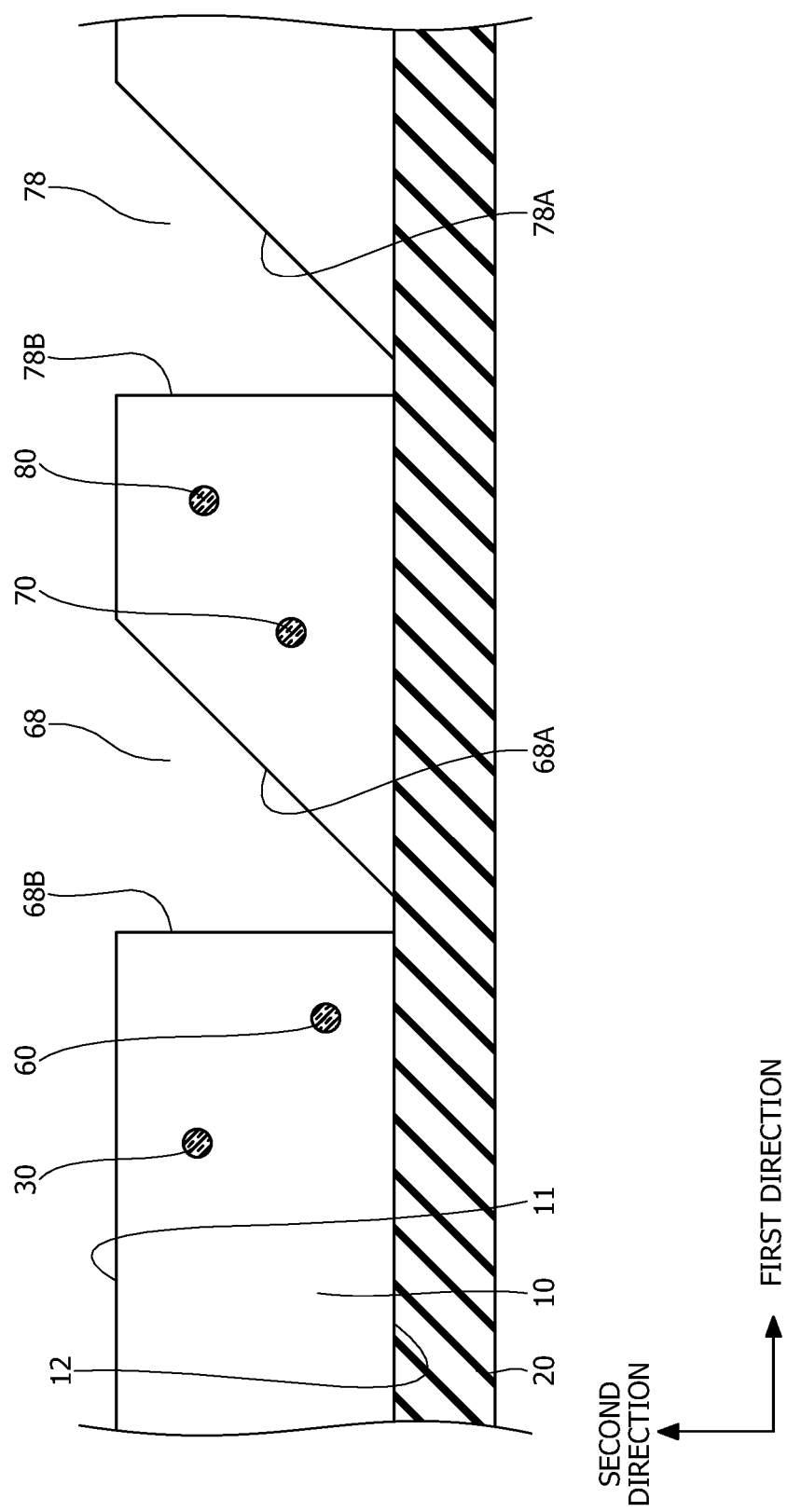
FIG. 38 is a diagram (part 2) illustrating the method of manufacturing a quantum circuit according to the fifth embodiment.

Next, as illustrated in FIG. 38, a groove 68 away from the color centers 30 and 60 and a groove 78 away from the color centers 70 and 80 are formed in the diamond layer 10. The grooves 68 and 78 are formed along the optical waveguides to be formed. For example, the groove 68 is formed between the color centers 30 and 60 and the color centers 70 and 80 in the first direction, and the groove 78 is formed further from the groove 68 than the color centers 70 and 80. The groove 68 has, for example, a side surface 68A inclined with respect to a first principal surface 11, and a side surface 68B perpendicular to the first principal surface 11. The side surface 68B is positioned between the color centers 30 and 60 and the side surface 68A. The side surface 68A may be visually identified from the first principal surface 11 side, and is formed to be inclined with respect to the first principal surface 11 by, for example, 40 to 50 degrees, preferably 45 degrees. The groove 78 has, for example, a side surface 78A inclined with respect to the first principal surface 11, and a side surface 78B perpendicular to the first principal surface 11. The side surface 78B is positioned between the color centers 70 and 80 and the side surface 78A. The side surface 78A may be visually identified from the first principal surface 11 side, and is formed to be inclined with respect to the first principal surface 11 by, for example, 40 to 50 degrees, preferably 45 degrees. The side surfaces 68A and 78A are exemplary inclined surfaces.

Figure 39:
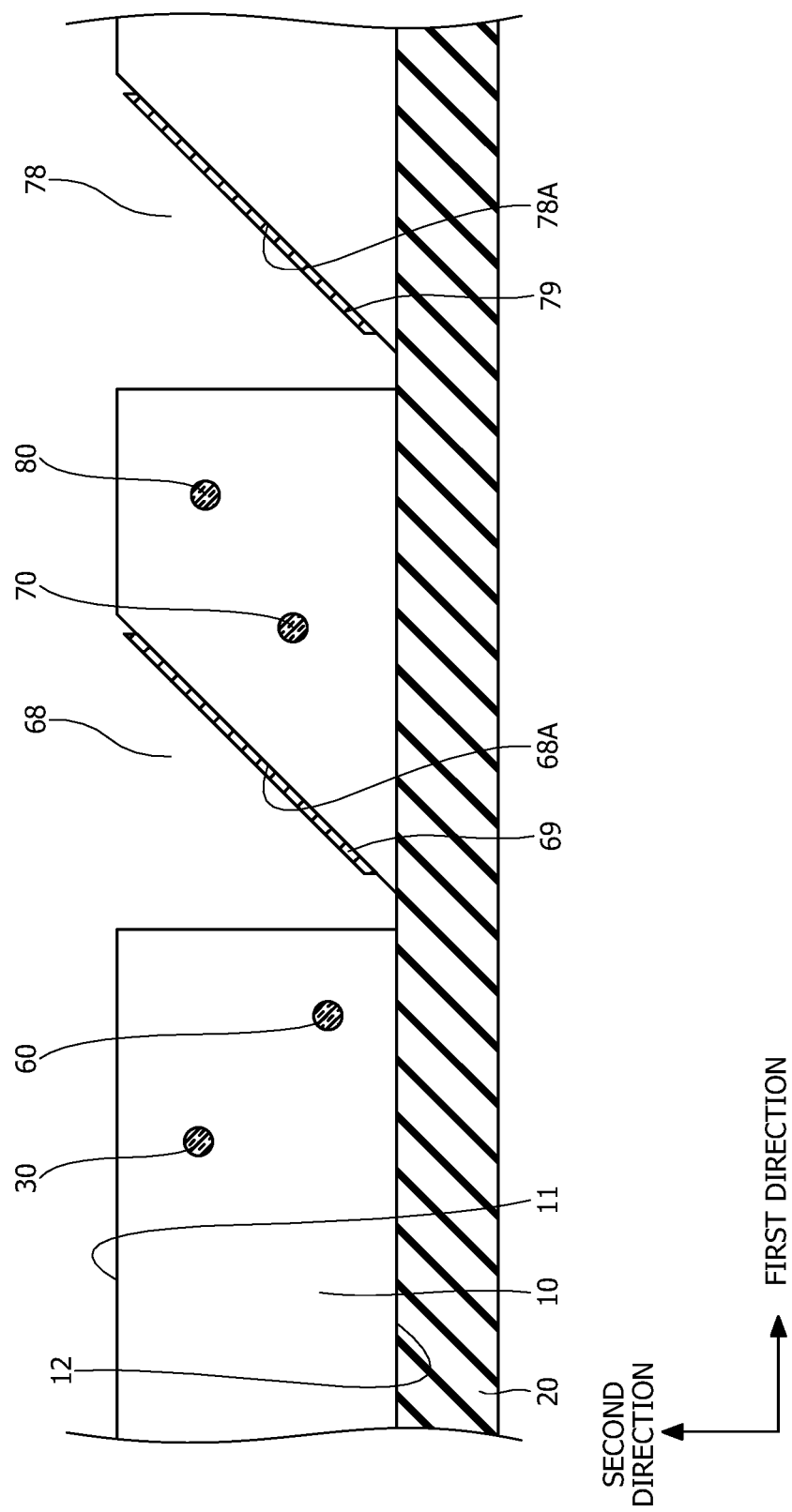
FIG. 39 is a diagram (part 3) illustrating the method of manufacturing a quantum circuit according to the fifth embodiment.

Thereafter, as illustrated in FIG. 39, a reflective film 69 that reflects femtosecond laser light is formed over the side surface 68A, and a reflective film 79 that reflects femtosecond laser light is formed over the side surface 78A. Here, for example, the reflective film 69 is formed over a part of the side surface 68A, and the reflective film 79 is formed over a part of the side surface 78A. The reflective films 69 and 79 are formed along the optical waveguides to be formed. The reflective films 69 and 79 are, for example, films made of metal such as Au, Al, or the like. Although the thickness of the reflective films 69 and 79 is not particularly limited, it is, for example, approximately 0.1 μm to 1.0 μm. The reflective films 69 and 79 may be formed by, for example, a lift-off method. The reflective films 69 and 79 may be formed simultaneously.

Figure 40:
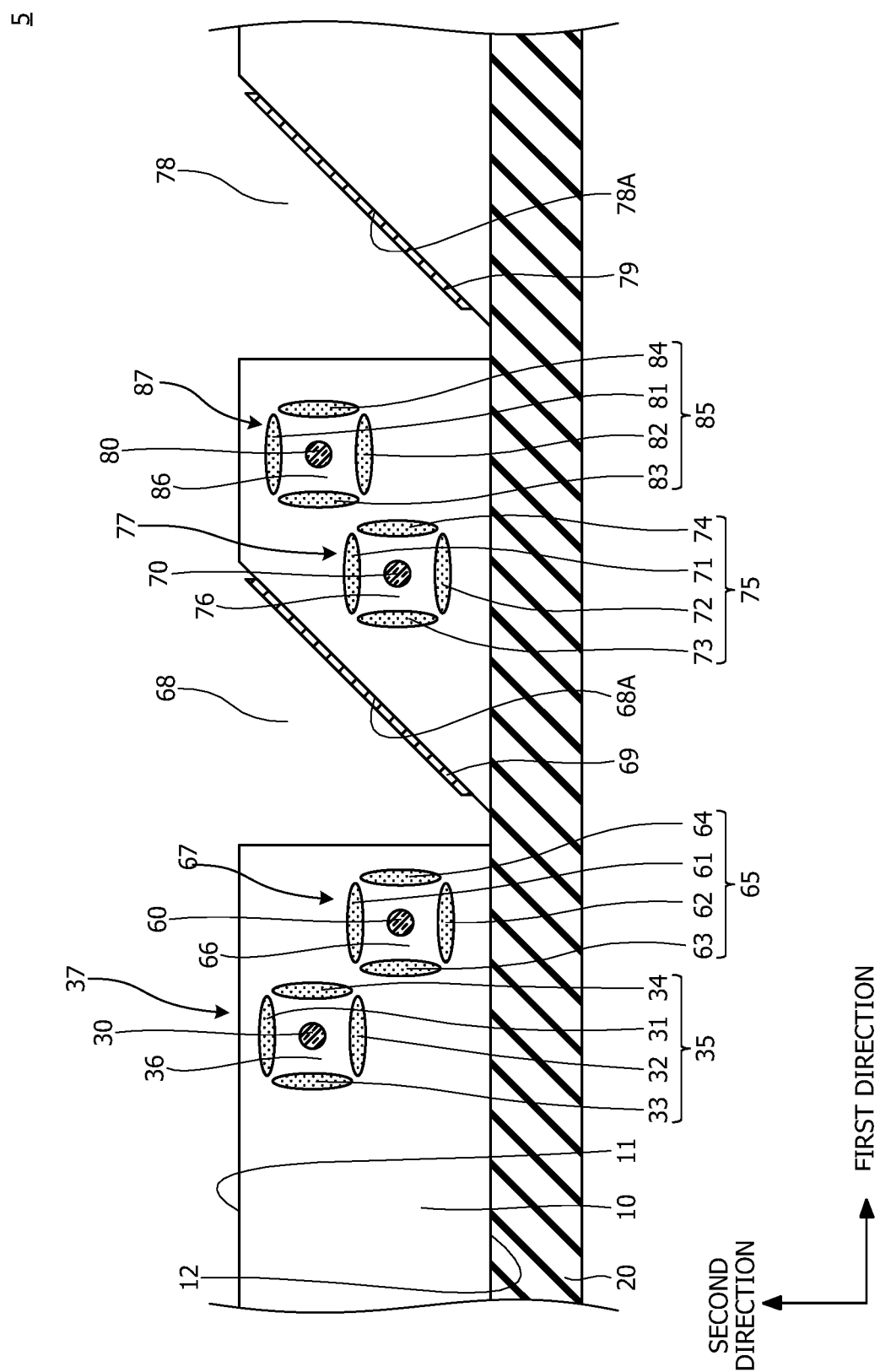
FIG. 40 is a diagram (part 4) illustrating the method of manufacturing a quantum circuit according to the fifth embodiment.

Subsequently, as illustrated in FIG. 40, altered regions 31 to 34 are formed in a similar manner to the first embodiment. Furthermore, altered regions 61 to 64, altered regions 71 to 74, and altered regions 81 to 84 are respectively formed in a similar manner to the formation of the altered regions 31 to 34. The altered regions 61 to 64 are formed in a linear shape to surround the color center 60 when viewed in the cross section, for example. The altered regions 71 to 74 are formed in a linear shape to surround the color center 70 when viewed in the cross section, for example. The altered regions 81 to 84 are formed in a linear shape to surround the color center 80 when viewed in the cross section, for example.

The refractive index of the region surrounded by the altered regions 61 to 64 is higher than the refractive index of the altered regions 61 to 64. Therefore, the altered regions 61 to 64 exert an optical confinement effect on the region surrounded by the altered regions 61 to 64. That is, an optical waveguide 67 having a core region 66 surrounded by the altered regions 61 to 64 and an optical confinement region 65 including the altered regions 61 to 64 is formed.

The refractive index of the region surrounded by the altered regions 71 to 74 is higher than the refractive index of the altered regions 71 to 74. Therefore, the altered regions 71 to 74 exert an optical confinement effect on the region surrounded by the altered regions 71 to 74. That is, an optical waveguide 77 having a core region 76 surrounded by the altered regions 71 to 74 and an optical confinement region 75 including the altered regions 71 to 74 is formed.

The refractive index of the region surrounded by the altered regions 81 to 84 is higher than the refractive index of the altered regions 81 to 84. Therefore, the altered regions 81 to 84 exert an optical confinement effect on the region surrounded by the altered regions 81 to 84. That is, an optical waveguide 87 having a core region 86 surrounded by the altered regions 81 to 84 and an optical confinement region 85 including the altered regions 81 to 84 is formed.

In this manner, it becomes possible to produce a quantum circuit 5 including an optical waveguide 37 optically coupled to the color center 30, the optical waveguide 67 optically coupled to the color center 60, the optical waveguide 77 optically coupled to the color center 70, and the optical waveguide 87 optically coupled to the color center 80.

Note that the order of forming the altered regions 61 to 64, 71 to 74, and 81 to 84 is not particularly limited.

Effects similar to those of the first embodiment may also be exerted by the fifth embodiment. Furthermore, it becomes possible to reduce a loss of optical signals propagating through the optical waveguides 67, 77, and 87. Moreover, the number of quantum bits included in the quantum circuit 5 may be easily increased.

In the third to fifth embodiments, the color centers 40, 50, 60, 70, and 80 may be formed at desired positions based on the method illustrated in FIGS. 20 and 21.

In each embodiment, a photodetector to be coupled to the optical waveguide may be positioned using the reflective film as a guide. In particular, the photodetector may be easily coupled to the optical waveguide highly efficiently when the position of the end of the optical waveguide coincides with the position of the end of the reflective film in the direction along which the optical waveguide extends.

The number of color centers and optical waveguides included in the quantum circuit according to the present disclosure is not limited.

Figure 41:
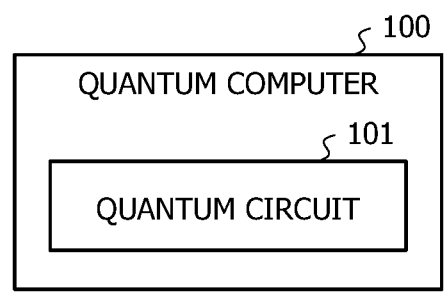
FIG. 41 is a diagram illustrating a quantum computer.

As illustrated in FIG. 41, those quantum circuits 1, 2, 3, 4, and 5 according to those embodiments may be incorporated in a quantum computer 100 and used as a quantum circuit 101, for example.

Although the preferred embodiments and the like have been described in detail above, the present disclosure is not limited to the embodiments and the like described above, and various modifications and substitutions may be made to the embodiments and the like described above without departing from the scope described in claims.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A method of manufacturing a quantum circuit, the method comprising:
    forming, in a diamond layer that includes a color center, an optical waveguide optically coupled the color center, the diamond layer having a first principal surface and a second principal surface,
    wherein the optical waveguide includes:
    a core region that includes the color center; and
    an optical confinement region provided around the core region,
    a refractive index of the optical confinement region is lower than the refractive index of the core region, and
    the forming the optical waveguide includes:
        forming, in the diamond layer, a groove that is away from the color center and has an inclined surface;
        forming a reflective film over the inclined surface;
        forming a first region on a side of the first principal surface of the color center by emitting femtosecond laser light to a first part of the reflective film and concentrating the femtosecond laser light reflected by the reflective film onto the side of the first principal surface of the color center to lower the refractive index of the first part of the diamond layer;
        forming a second region on a side of the second principal surface of the color center by emitting the femtosecond laser light to a second part of the reflective film and concentrating the femtosecond laser light reflected by the reflective film onto the side of the second principal surface of the color center to lower the refractive index of the second part of the diamond layer;
        forming a third region on a first side of the core region by emitting the femtosecond laser light to the first part of the first principal surface and concentrating the femtosecond laser light onto the first side of the core region in a first direction parallel to the first principal surface to lower the refractive index of the second part of the diamond layer; and
        forming a fourth region on a second side of the core region by emitting the femtosecond laser light to the second part of the first principal surface and concentrating the femtosecond laser light onto the second side of the core region in the first direction to lower the refractive index of the second part of the diamond layer.

2. The method of manufacturing the quantum circuit according to claim 1, wherein
    a dimension of the first region and the second region in the first direction is more than a dimension of the first region and the second region in a second direction perpendicular to the first principal surface, and
    a dimension of the third region and the fourth region in the second direction is more than a dimension of the third region and the fourth region in the first direction.

3. The method of manufacturing the quantum circuit according to claim 1, wherein the color center includes a vacancy and at least one selected from nitrogen, silicon, germanium, tin, lead, and boron.

4. The method of manufacturing the quantum circuit according to claim 1, wherein the diamond layer includes a plurality of color centers, and the first region and the second region are formed by using the reflective film such that is common to the plurality of color centers.

5. The method of manufacturing the quantum circuit according to claim 1, wherein the diamond layer includes a plurality of color centers, and
    the first region and the second region are formed by using a different reflective film for each of plurality of color centers.

6. The method of manufacturing the quantum circuit according to claim 4, wherein a distance from the first principal surface is different for each of the plurality of color centers.

7. A quantum circuit comprising:
    a color center in a diamond layer that has a first principal surface and a second principal surface, the diamond layer including a plurality of color centers; and
    an optical waveguide formed in the diamond layer and optically coupled the color center,
    wherein the optical waveguide includes:
    a core region that includes the color center; and
    an optical confinement region provided around the core region,
    a refractive index of the optical confinement region is lower than the refractive index of the core region,
    the optical confinement region includes:
        a first region provided on a side of the first principal surface of the core region;
        a second region provided on a side of the second principal surface of the core region, the first region and the second region being formed by using a different reflective film for each of plurality of color centers;

a third region provided on a first side of the core region in a first direction parallel to the first principal surface; and a fourth region provided on a second side of the core region in the first direction, a dimension of the first region and the second region in the first direction is more than the dimension in a second direction perpendicular to the first principal surface, and a dimension of the third region and the fourth region in the second direction is more than the dimension in the first direction.

8. The quantum circuit according to claim 7, wherein a dimension of the first region and the second region in the first direction is more than a dimension of the first region and the second region in a second direction perpendicular to the first principal surface, and a dimension of the third region and the fourth region in the second direction is more than a dimension of the third region and the fourth region in the first direction.

9. The quantum circuit according to claim 7, wherein the color center includes a vacancy and at least one selected from nitrogen, silicon, germanium, tin, lead, and boron.

10. The quantum circuit according to claim 7, wherein a distance from the first principal surface is different for each of the plurality of color centers.

11. A quantum computer comprising:

a quantum circuit includes:

a color center in a diamond layer that has a first principal surface and a second principal surface, the diamond layer including a plurality of color centers; and an optical waveguide formed in the diamond layer and optically coupled the color center, wherein the optical waveguide includes:

a core region that includes the color center; and an optical confinement region provided around the core region, a refractive index of the optical confinement region is lower than the refractive index of the core region, the optical confinement region includes:

a first region provided on a side of the first principal surface of the core region;

a second region provided on a side of the second principal surface of the core region, the first region and the second region being formed by using a different reflective film for each of plurality of color centers;

a third region provided on a first side of the core region in a first direction parallel to the first principal surface; and a fourth region provided on a second side of the core region in the first direction, a dimension of the first region and the second region in the first direction is more than the dimension in a second direction perpendicular to the first principal surface, and a dimension of the third region and the fourth region in the second direction is more than the dimension in the first direction.

\* \* \* \* \*